United States Patent
Kudo et al.

(10) Patent No.: US 9,973,017 B2
(45) Date of Patent: May 15, 2018

(54) CHARGER CIRCUIT INCLUDING A PLURALITY OF CHARGING PATHS

(71) Applicant: SAMSUNG ELECTRONICS CO., LTD., Suwon-si, Gyeonggi-Do (KR)

(72) Inventors: Ryotaro Kudo, Seongnam-si (KR); Dongjin Keum, Suwon-si (KR); Yus Ko, Yongin-si (KR); Hyunseok Nam, Suwon-si (KR); Gwang-Yol Noh, Anyang-si (KR); Whanseok Seo, Incheon (KR); Jaeyoup Choi, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 267 days.

(21) Appl. No.: 14/856,376

(22) Filed: Sep. 16, 2015

(65) Prior Publication Data

US 2016/0087462 A1 Mar. 24, 2016

Related U.S. Application Data

(60) Provisional application No. 62/052,723, filed on Sep. 19, 2014.

(30) Foreign Application Priority Data

Feb. 23, 2015 (KR) .......................... 10-2015-0025298

(51) Int. Cl.
  *H02J 7/00* (2006.01)
(52) U.S. Cl.
  CPC ............ *H02J 7/0068* (2013.01); *H02J 7/007* (2013.01); *H02J 7/0052* (2013.01)

(58) Field of Classification Search
  CPC ......... H02J 7/0052; H02J 7/0068; H02J 7/007
  (Continued)

(56) References Cited

U.S. PATENT DOCUMENTS 6,597,153 B1 7/2003 Bucur
7,489,109 B1 2/2009 Qian et al.
(Continued)

FOREIGN PATENT DOCUMENTS

JP 2004-297860 10/2004
JP 2012-147612 8/2012
JP 2012-196084 10/2012

OTHER PUBLICATIONS

Texas Instruments, "I2C Controlled 4.5A Single Cell USB/Adapter Charger", SLUSAW5A—Jan. 2012—Revised Oct. 2012, pp. 1-46.

*Primary Examiner* — Nathaniel Pelton
(74) *Attorney, Agent, or Firm* — F. Chau & Associates, LLC

(57) ABSTRACT

A charger circuit includes a first path regulator, a path switch, and a second path regulator. The first path regulator is configured to generate a first regulation current based on an input voltage and an input current. The path switch is configured to pass or block a first charging current in response to a control signal. The first charging current is generated based on the first regulation current. The second path regulator is configured to generate a second regulation current based on the input voltage and the input current. At least one of the first charging current and a second charging current is used to charge a battery. The second charging current is generated based on the second regulation current. The second charging current is transferred to the battery without passing through the path switch.

20 Claims, 15 Drawing Sheets

(58) Field of Classification Search
USPC .......................................................... 320/162
See application file for complete search history.

(56) References Cited

U.S. PATENT DOCUMENTS

| | | | |
|---|---|---|---|
| 7,615,965 B2* | 11/2009 | Popescu-Stanesti | H02J 1/08 |
| | | | 307/46 |
| 7,710,079 B2 | 5/2010 | Martin et al. | |
| 7,764,050 B2 | 7/2010 | Xing et al. | |
| 7,791,319 B2 | 9/2010 | Veselic et al. | |
| 7,965,058 B2 | 6/2011 | Veselic | |
| 8,120,312 B2 | 2/2012 | Bucur et al. | |
| 8,350,408 B2 | 1/2013 | Miyanaga et al. | |
| 8,378,626 B2 | 2/2013 | Wang | |
| 2009/0195214 A1 | 8/2009 | Gehrke et al. | |
| 2014/0347003 A1* | 11/2014 | Sporck | H02J 7/0052 |
| | | | 320/107 |
| 2014/0375278 A1* | 12/2014 | Kim | H02J 7/041 |
| | | | 320/155 |
| 2015/0084582 A1* | 3/2015 | Peterson | H02J 7/0055 |
| | | | 320/107 |
| 2015/0097520 A1* | 4/2015 | Lin | H02J 7/025 |
| | | | 320/108 |
| 2015/0280473 A1* | 10/2015 | Zhao | H02J 7/0052 |
| | | | 320/107 |

* cited by examiner

FIG. 7

| Charging Mode | Path | Charging Current |
|---|---|---|
| Mode 1 | 1 | Ic = I1 |
| Mode 2 | 2 | Ic = I2 |
| Mode 3 | 1 and 2 | Ic = I1 + I2 |

CHARGER CIRCUIT INCLUDING A PLURALITY OF CHARGING PATHS

CROSS-REFERENCE TO RELATED APPLICATIONS

The present application claims priority under 35 U.S.C. § 119 to U.S. Provisional Patent Application No. 62/052,723, filed on Sep. 19, 2014, in the U.S. Patent and Trademark Office, and to Korean Patent Application No. 10-2015-0025298, filed on Feb. 23, 2015, in the Korean Intellectual Property Office, the disclosures of which are incorporated by reference herein in their entireties.

TECHNICAL FIELD

The present inventive concept relates to an electronic circuit, and more particularly, to a charger circuit including a plurality of charging paths.

DISCUSSION OF THE RELATED ART

An electronic device (e.g., a mobile electronic device) may include a charger circuit to charge a battery that powers the device.

The charger circuit may be used to supply power required to operate a mobile electronic device. The charger circuit may include a path switch to control current flow in charging the battery. As a voltage difference across the path switch or current flowing through the path switch increases, power consumption through the path switch may also increase.

SUMMARY

According to an exemplary embodiment of the present inventive concept, a charger circuit is provided. The charger circuit includes a first path regulator, a path switch, and a second path regulator. The first path regulator is configured to generate a first regulation current based on an input voltage and an input current. The path switch is configured to pass or block a first charging current in response to a control signal. The first charging current is generated based on the first regulation current. The second path regulator is configured to generate a second regulation current based on the input voltage and the input current. At least one of the first charging current and a second charging current is used to charge a battery. The second charging current is generated based on the second regulation current. The second charging current is transferred to the battery without passing through the path switch.

The charger circuit may further include a charger controller. The charger controller may generate the control signal, and to control an operation of each of the first path regulator, the path switch, and the second path regulator.

In a charging mode where the battery is charged, the path switch may block the first charging current, and the second charging current may be used to charge the battery.

In the charging mode, the first path regulator may generate a first regulation voltage based on the input voltage and the input current, and a system voltage provided to a power management chip is generated based on the first regulation voltage.

Each of the first and second path regulators may include a buck converter, a boost converter, a buck-boost converter, or a linear regulator.

According to an exemplary embodiment of the present inventive concept, a charger circuit is provided. The charger circuit includes a first charging path and a second charging path. The first charging path transfers a first charging current to charge a battery. The first charging current is generated based on an input voltage and an input current. The second charging path transfers a second charging current to charge the battery. The second charging current is generated based on the input voltage and the input current. The first charging path includes a path switch configured to pass or block the first charging current in response to a control signal. The second charging path does not include the path switch.

The charger circuit may further include a charger controller. The charge controller may generate the control signal, to control an operation of the path switch, and to control at least one of intensity of the first charging current, intensity of the second charging current, and a ratio of the intensity of the first charging current to the intensity of the second charging current.

In a charging mode where the battery is charged, the path switch may pass the first charging current, and at least one of the first charging current and the second charging current may be used to charge the battery.

When a value of an output voltage of the battery is smaller than a reference value in the charging mode, the second charging current may have intensity of "0", and the first charging current may be used to charge the battery, according to the control signal of the charger controller.

When the value of the output voltage of the battery is greater than or equal to the reference value in the charging mode, a third charging current may be used to charge the battery according to the control signal of the charger controller. The third charging current may correspond to a sum of the first charging current and the second charging current.

The input voltage and the input current may be supplied from at least one power source.

The first charging path may further include one or more regulators.

The second charging path may include one or more regulators.

According to an exemplary embodiment of the present inventive concept, a charger circuit is provided. The charger circuit includes an input switch, a first path regulator, a path switch, a second path regulator, and a charger controller. The input switch includes a first terminal connected to an input terminal of the charger circuit, and a second terminal connected to first terminal of a first path regulator. An input voltage and an input current are received through the input terminal. The first path regulator is configured to generate a first regulation voltage based on the input voltage and the input current provided to the first path regulator through the input switch. The path switch includes a first terminal connected to a system terminal, and a second terminal connected to a battery. The system terminal outputs a system voltage generated based on the first regulation voltage. The second path regulator is configured to generate a second regulation voltage based on the input voltage and the input current provided to the second path regulator through the input switch. A first terminal of the second path regulator is connected to the second terminal of the input switch. A charger controller controls an operation of each of the input switch, the first path regulator, the path switch, and the second path regulator. The path switch is not connected between the battery and the second path regulator.

The charger circuit may operate in a boost mode for supplying power to a peripheral device when the charger controller detects that the peripheral device is connected to the input terminal.

According to an exemplary embodiment of the present inventive concept, a charger circuit is provided. The charger circuit includes a first charging path and a second charging path. The first charging path transfers a first charging current to charge a battery. The second charging path transfers a second charging current to charge the battery. The first charging path includes a first path regulator and a path switch. The path switch passes or blocks the first charging current in response to a control signal. The second charging path includes a second path regulator without the path switch. The first path regulator includes first and second transistors, and a switching driver for turning on or turning off each of the first and second transistors in an alternate manner to generate the first charging current.

Intensity of the first charging current may be controlled by adjusting a turn-on time of each of the first and second transistors.

The first charging current and the second charging current may be interleaved with each other.

The charger circuit may further include a charger controller. The charger controller may generate the control signal, and to control an operation of each of the first path regulator, the path switch, and the second path regulator.

The charger circuit may further include a charger controller. The charger controller may control a ratio of intensity of the first charging current to intensity of the second charging current.

The charger circuit may further include an input switch. The input switch may include a first terminal connected to an input terminal of the charger circuit, and a second terminal connected to the first path regulator. The path switch may include a third terminal connected to a system terminal, and a fourth terminal connected to the battery. The system terminal may output a system voltage based on an output of the first path regulator.

When the input terminal is floated, the path switch may be turned on and an output voltage of the battery may be provided to the system terminal through the turned-on path switch.

The charger circuit may operate in a boost mode for supplying power to a peripheral device when the peripheral device is connected to the input terminal.

BRIEF DESCRIPTION OF THE DRAWINGS

The above and other features of the present inventive concept will become more apparent by describing exemplary embodiments thereof with reference to the following figures, in which:

FIG. 7 is a table illustrating a charging mode according to an exemplary embodiment of the present inventive concept;

DETAILED DESCRIPTION OF THE EMBODIMENTS

Figure 1:
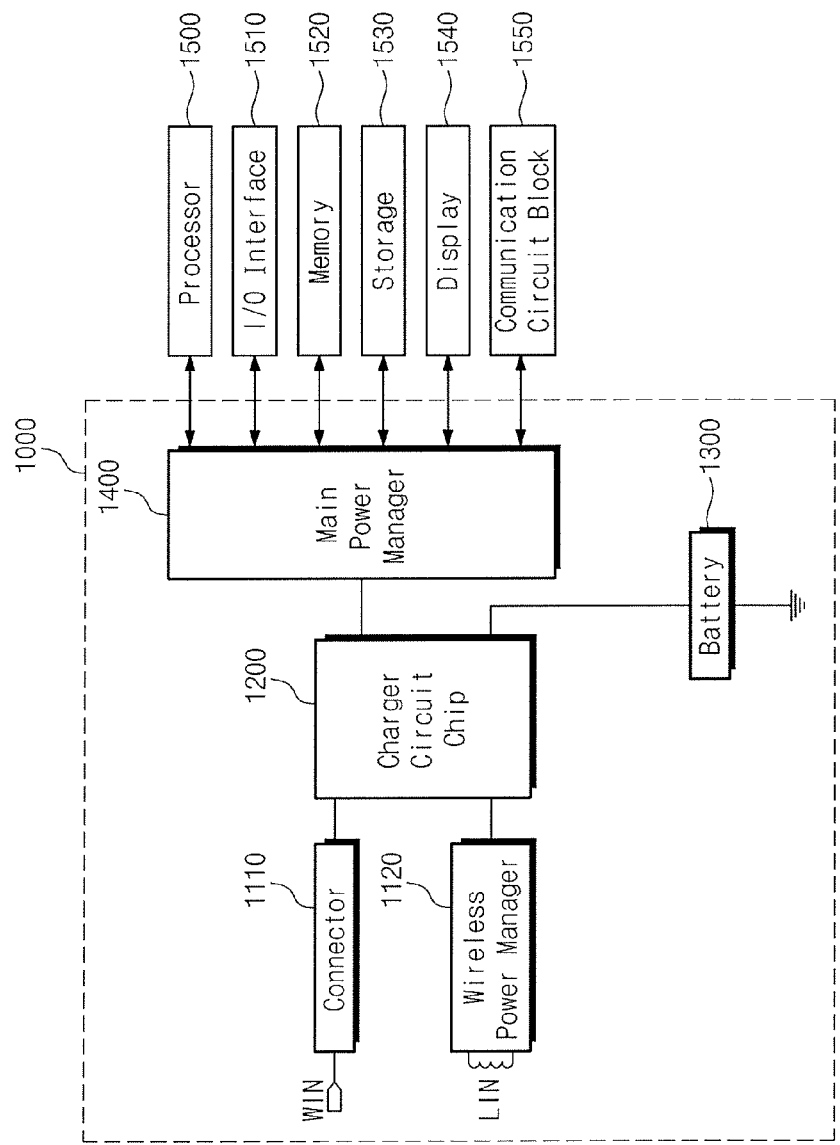
FIG. 1 is a block diagram illustrating a power system of a mobile electronic device including a charger circuit chip according to an exemplary embodiment of the present inventive concept.

Exemplary embodiments of the present inventive concept will be described in detail with reference to the accompanying drawings. The present inventive concept, however, may be embodied in various different forms, and should not be construed as being limited to the embodiments set forth herein. Unless otherwise noted, like reference numerals may denote like elements throughout the drawings and the specification. In the drawings, the sizes and relative sizes of layers and regions may be exaggerated for clarity.

As used herein, the singular forms "a", "an" and "the" are intended to include the plural forms as well, unless the context clearly indicates otherwise. As used herein, the term "and/or" includes any and all combinations of one or more of the associated listed items.

FIG. 1 is a block diagram illustrating a power system 1000 of a mobile electronic device including a charger circuit chip according to an exemplary embodiment of the present inventive concept. In an exemplary embodiment, the power system 1000 may include a connector 1110, a wireless power manager 1120, a charger circuit chip 1200, a battery 1300, and a main power manager 1400. The power system 1000 may further include other components which are not shown in FIG. 1. In an exemplary embodiment of the present inventive concept, one or more of the components shown in FIG. 1 may not be included in the power system 1000.

The power system 1000 may be used to supply power to a mobile electronic device. The power system 1000 may be supplied with power from a power source that is connected through a transformation device, such as an adapter, in a wired manner. In an exemplary embodiment of the present inventive concept, the power system 1000 may be supplied with power from a power source that is wirelessly connected to the power system 1000 through, for example, resonant inductive coupling. The power system 1000 may convert the supplied power to, e.g., an appropriate form or level. The power system 1000 may supply the converted power to components of the mobile electronic device.

For example, the connector 1110 may be connected with a transformation device, such as an adapter, through a wired input terminal WIN. The connector 1110 may receive power from a power source which is connected to the connector 1110 in a wired manner. The connector 1110 may convert the received power to, e.g., an appropriate form or level, and may provide the converted power to the charger circuit chip 1200.

For example, the wireless power manager 1120 may be connected with an input inductor LIN. The input inductor LIN may resonate with a transmission inductor of a wireless power transmitter. The wireless power manager 1120 may receive power from a power source which is connected to the wireless power manger 1120 in a wireless manner. For example, the wireless manner may include resonant coupling between the input inductor LIN and the transmission inductor. The wireless power manager 1120 may convert the received power in an appropriate form and level, and may provide the converted power to the charger circuit chip 1200.

The charger circuit chip 1200 may include a charger circuit according to an exemplary embodiment of the present inventive concept. The charger circuit according to an exemplary embodiment of the present inventive concept may be included in a chip such as the charger circuit chip 1200. In an exemplary embodiment of the present inventive concept, the charger circuit may be included in a device or system. Hereinafter, it will be assumed that the charger circuit according to an exemplary embodiment of the present inventive concept is implemented in a chip. However, exemplary embodiments of the present inventive concept are not limited thereto.

The charger circuit chip 1200 may operate in a "battery power mode", a "charging mode", a "boost mode", or the like. For example, when no power is supplied through the connector 1110 and the wireless power manager 1120, the charger circuit chip 1200 may operate in the battery power mode. In the battery power mode, the charger circuit chip 1200 may be supplied with power from the battery 1300. The charger circuit chip 1200 may convert the power supplied from the battery 1300 to, e.g., an appropriate form or level, and may provide the converted power to the main power manager 1400.

The charger circuit chip 1200 may receive power from at least one of the connector 1110 and the wireless power manager 1120. For example, when power is provided through at least one of the connector 1110 and the wireless power manager 1120, the charger circuit chip 1200 may operate in the charging mode. In the charging mode, the charger circuit chip 1200 may convert the power received from the connector 1110 or the wireless power manager 1120 to, e.g., an appropriate form or level. The charger circuit chip 1200 may charge the battery 1300 by using the converted power. Further, the charger circuit chip 1200 may provide the converted power to the main power manager 1400.

For example, a peripheral device (e.g., a keyboard, a speaker, etc.) that assists the use of the mobile electronic device may be connected with the charger circuit chip 1200 through the connector 1110. The charger circuit chip 1200 may operate in the boost mode to supply power to the peripheral device. In the boost mode, the charger circuit chip 1200 may boost an output voltage of the battery 1300, and may provide the boosted voltage to the peripheral device. In the boost mode, the charger circuit chip 1200 may convert the power provided from the battery 1300 to, e.g., an appropriate form or level, and may provide the converted power to the main power manager 1400.

A configuration and operations of the charger circuit chip 1200 according to an exemplary embodiment of the present inventive concept will be more fully described with reference to FIGS. 2 to 6. The charging mode of the charger circuit chip 1200 will be more fully described with reference to FIGS. 7 to 10, the boost mode will be more fully described with reference to FIG. 11, and the battery power mode will be more fully described with reference to FIG. 12.

The main power manager 1400 may receive power from the charger circuit chip 1200. For example, the main power manager 1400 may convert a voltage received from the charger circuit chip 1200 into a stable voltage. The main power manager 1400 may provide the stable voltage to other components (e.g., a processor 1500, an input/output interface 1510, a memory 1520, a storage 1530, a display 1540, and a communication circuit block 1550) of the mobile electronic device.

In some exemplary embodiments, each of the wireless power manager 1120, the charger circuit chip 1200, and the main power manager 1400 may be implemented as an integrated circuit chip. In an exemplary embodiment of the present inventive concept, each of the wireless power manager 1120, the charger circuit chip 1200, and the main power manager 1400 may be packaged according to any one of various packaging technologies. The various packaging technologies may include package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), and wafer-level processed stack package (WSP).

Figure 2:
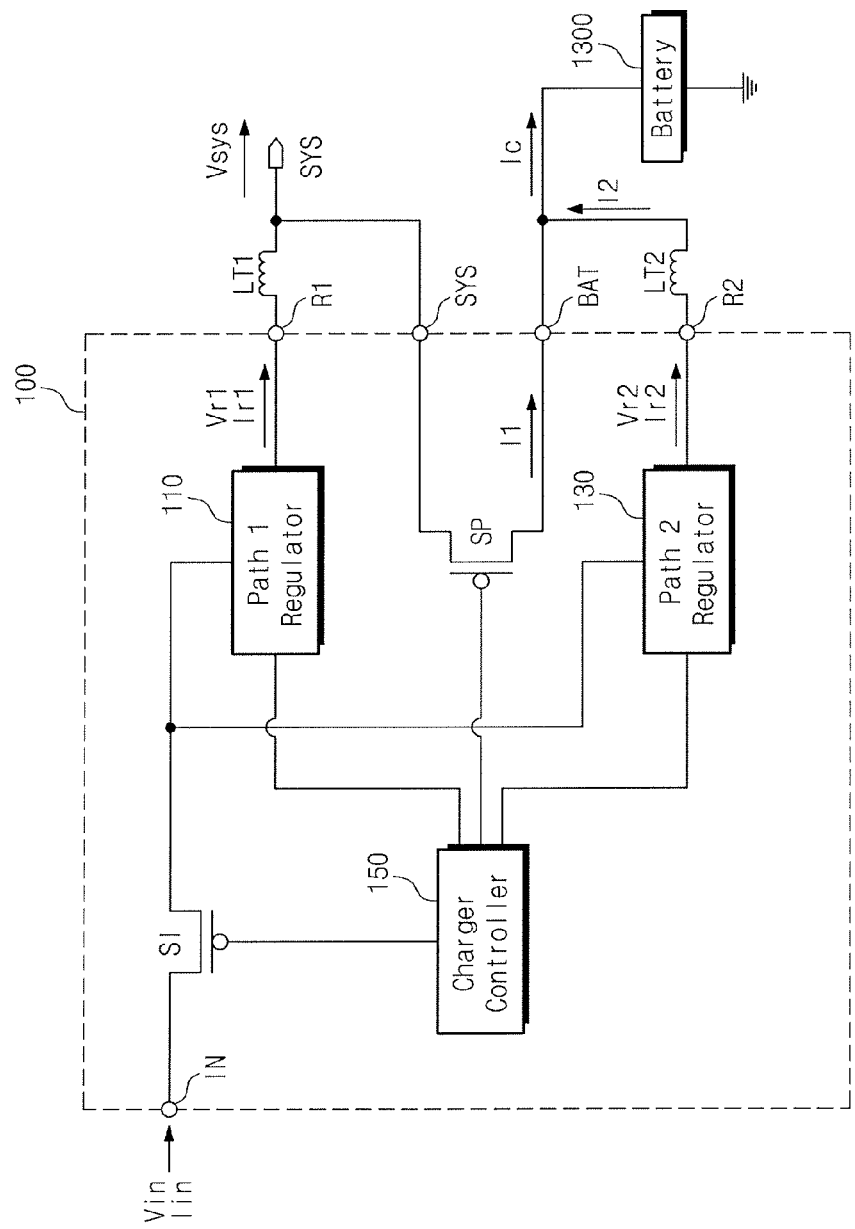
FIG. 2 is a block diagram illustrating a charger circuit chip according to an exemplary embodiment of the present inventive concept.

FIG. 2 is a block diagram illustrating a charger circuit chip 100 according to an exemplary embodiment of the present inventive concept. The charger circuit chip 100 may include a first path regulator 110, a path switch SP, and a second path regulator 130. The charger circuit chip 100 may further include an input switch SI and a charger controller 150.

In an exemplary embodiment of the present inventive concept, the charger circuit chip 1200 of FIG. 1 may include the charger circuit chip 100 of FIG. 2. While FIG. 2 illustrates a configuration of the charger circuit chip 100 to help understanding of the present inventive concept, the present inventive concept is not limited thereto. The charger circuit chip 100 may further include components which are not shown in FIG. 2. In an exemplary embodiment of the present inventive concept, the charger circuit chip 100 may not include one or more of components which are shown in FIG. 2.

The charger circuit chip 100 may receive at least one of an input voltage Vin and input current Iin. For example, the input voltage Vin and the input current Iin may be provided from one or more power sources. For example, the input voltage Vin and the input current Iin may be provided from at least one of the connector 1110 and the wireless power manager 1120 of FIG. 1. The charger circuit chip 100 may receive the input voltage Vin and the input current Iin through an input terminal IN.

A first terminal of the input switch SI may be connected with the input terminal IN. The input switch SI may operate in response to a control of the charger controller 150. Under the control of the charger controller 150, the input switch SI may pass or block the input current Iin provided through the input terminal IN of the charger circuit chip 100. The input voltage Vin, and the input current Iin passing through the input switch SI may be provided to the first path regulator 110 and the second path regulator 120 through a second terminal of the input switch SI.

Referring to FIG. 2, the input switch SI may be a p-channel metal oxide semiconductor (PMOS) transistor. However, exemplary embodiments of the present inventive concept are not limited thereto. The input switch SI may include a component for controlling a transfer of the input voltage Vin and a flow of the input current Iin. For example, the input switch SI may be implemented as an n-channel metal oxide semiconductor (NMOS) transistor, a switching element, a gate circuit, a buffer circuit, or the like.

The first path regulator 110 may be connected with another terminal of the input switch SI. The first path regulator 110 may receive the input voltage Vin and the input current Iin through the input switch SI. The first path regulator 110 may generate a first regulation voltage Vr1 and a first regulation current Ir1, based on the input voltage Vin and the input current Iin. For example, the first path regulator 110 may operate in response to the control of the charger controller 150. The first regulation voltage Vr1 and the first regulation current Ir1 may be output through a first output terminal R1 of the charger circuit chip 100.

In an exemplary embodiment of the present inventive concept, the first path regulator 110 may include a buck converter. However, exemplary embodiments of the present inventive concept are not limited thereto. For example, the first path regulator 110 may include various kinds of switching regulators, such as a boost converter, a buck-boost converter, etc. In addition, the first path regulator 110 may include a linear regulator, such as a low dropout regulator, etc. The implementation of the first path regulator 110 may be variously changed.

The first regulator 110 may be connected to a first inductor LT1 through the first output terminal R1 to generate the first regulation voltage Vr1 and the first regulation current Ir1. The first regulation voltage Vr1 and the first regulation current Ir1 may be provided to a system terminal SYS through the first inductor LT1.

As illustrated in FIG. 2, the first inductor LT1 may be disposed at the outside (e.g., on an "off-chip" area) of the charger circuit chip 100. In an exemplary embodiment of the present inventive concept, the first inductor LT1 may be disposed inside the charger circuit chip 100. For example, the first inductor LT1 may be a discrete inductive element, but exemplary embodiments of the present inventive concept are not limited thereto. For example, the first inductor LT1 may include a simulated inductor including a semiconductor element. The implementation of the first inductor LT1 may be variously changed.

The system terminal SYS may output a system voltage Vsys. The system voltage Vsys may be generated based on the first regulation voltage Vr1. The system voltage Vsys may be provided to another component (e.g., a main power manager 1400 of FIG. 1) of the mobile electronic device of FIG. 1. In addition, the first charging current I1 may be generated based on the first regulation current Ir1. The first charging current I1 may be provided to a path switch SP through the system terminal SYS.

A first terminal of the path switch SP may be connected to the system terminal SYS. A second terminal of the path switch SP may be connected to a battery terminal BAT that may be connected with the battery 1300. The path switch SP may operate in response to a control signal. The control signal may be generated by the charger controller 150 and may be input to a third terminal of the path switch SP. The path switch SP may pass or block the first charging current I1 in response to the control signal generated by the charger controller 150. The first charging current I1 passing through the path switch SP may be provided to the battery terminal BAT.

Referring to FIG. 2, the path switch SP may be a PMOS transistor. However, exemplary embodiments of the present inventive concept are not limited thereto. The path switch SP may include a component for controlling flow of the charging current I1. For example, the path switch SP may be implemented as an NMOS transistor, a switching element, a gate circuit, a buffer circuit, etc. In an exemplary embodiment of the present inventive concept, the path switch SP may be implemented with an integrated circuit separate from the charger circuit chip 100.

The second path regulator 130 may be connected with the second terminal of the input switch SI. The second path regulator 130 may receive the input voltage Vin and the input current Iin through the input switch SI. The second path regulator 130 may generate a second regulation voltage Vr2 and a second regulation current Ir2, based on the input voltage Vin and the input current Iin. For example, the second path regulator 130 may operate in response to the control of the charger controller 150. The second regulation voltage Vr2 and the second regulation current Ir2 may be output through a second output terminal R2 of the charger circuit chip 100.

In an exemplary embodiment of the present inventive concept, the second path regulator 130 may include a buck converter. However, exemplary embodiments of the present inventive concept are not limited thereto. For example, the second path regulator 130 may include various kinds of switching regulators, such as a boost converter, a buck-boost converter, etc. In addition, the second path regulator 130 may include a linear regulator, such as a low dropout regulator, etc. The implementation of the second path regulator 130 may be variously changed.

The second regulator 130 may be connected to a second inductor LT2 through the second output terminal R2 to generate the second regulation voltage Vr2 and the second regulation current Ir2. As illustrated in FIG. 2, the second inductor LT2 may be disposed at the outside (e.g., on an "off-chip" area) of the charger circuit chip 100. In an exemplary embodiment of the present inventive concept, the second inductor LT2 may be disposed inside the charger circuit chip 100. For example, the second inductor LT2 may be a discrete inductive element, but exemplary embodiments of the present inventive concept are not limited thereto. For example, the second inductor LT2 may include a simulated inductor including semiconductor elements. The implementation of the second inductor LT2 may be variously changed.

The second inductor LT2 may generate a second charging current I2 based on the second regulation current Ir2. The second charging current I2 may be provided to the battery terminal BAT. The first charging current I1 passing through the path switch SP and the second charging current I2 output from the second inductor LT2 may flow into the battery terminal BAT. Thus, a charging current Ic corresponding to a sum of the first charging current I1 and the second charging current I2 may be provided to the battery 1300. The charging current Ic may be used to charge the battery 1300. For example, at least one of the first charging current I1 passing through the path switch SP and the second charging current I2 may be used to charge the battery 1300.

As described with reference to FIG. 2, the first charging current I1 may be provided to the battery 1300 along a "first charging path" which includes the path switch SP. In addition, the second charging current I2 may be provided to the battery 1300 along a "second charging path" which does not include the path switch SP. Accordingly, the second charging current I2 may be provided to the battery 1300 without passing through the path switch SP. The first charging path and the second charging path will be more fully described with reference to FIGS. 3 and 4.

Referring to FIG. 2, the charger controller 150 may control overall operations of the charger circuit chip 100. For example, the charger controller 150 may control operations of the input switch SI. The charger controller 150 may generate the control signal to control operations of the path switch SP. The charger controller 150 may control operations of the first path regulator 110 to control the intensity of the first charging current L1. The charger controller 150 may control operations of the second path regulator 130 to control the intensity of the second charging current L2. In addition, the charger controller 150 may control a ratio of the intensity of the first charging current I1 to the intensity of the second charging current I2.

However, the present inventive concept is not limited to the above-described exemplary embodiments. In an exemplary embodiment of the present inventive concept, the charger controller 150 may further perform one or more operations that are not described above. In an exemplary embodiment of the present inventive concept, the charger controller 150 may not perform one or more of the operations that are described above.

Referring to FIG. 2, the charger controller 150 is illustrated as a single component. In an exemplary embodiment of the present inventive concept, a plurality of charger controllers may be independently implemented for respective components of the charger circuit chip 100. For example, a charger controller for controlling operations of the path switch SP may be separately provided from a charger controller for controlling operations of the first path regulator 110. While FIG. 2 illustrates a configuration of the charger circuit chip 100 to help understanding of the present inventive concept, the present inventive concept is not limited thereto.

Figure 3:
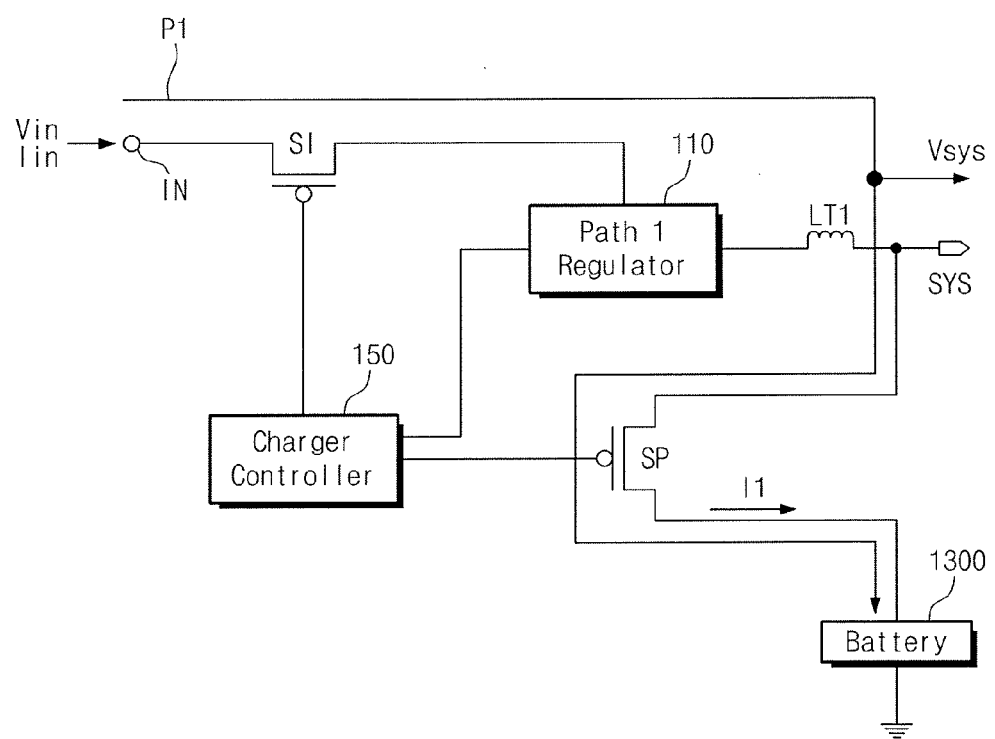
FIG. 3 is a diagram for describing a first charging path of the charger circuit chip of FIG. 2 according to an exemplary embodiment of the present inventive concept.

FIG. 3 is a diagram for describing a first charging path of the charger circuit chip 100 of FIG. 2 according to an exemplary embodiment of the present inventive concept. In an exemplary embodiment of the present inventive concept, the first charging path P1 may include an input switch SI, a first path regulator 110, a first inductor LT1, and a path switch SP.

The first charging path P1 may transfer the first charging current I1 to the battery 1300. As described with reference to FIG. 2, the first charging current I1 may be generated based on the input voltage Vin and the input current Iin. To generate the first charging current I1, the first charging path P1 may include the first path regulator 110. To transfer the first charging current I1 to the battery 1300, a charger controller 150 may control operations of the input switch SI, the first path regulator 110, and the path switch SP.

In addition, the first charging path P1 may transfer the system voltage Vsys to the system terminal SYS. As described with reference to FIG. 2, the system voltage Vsys may be generated based on the input voltage Vin and the input current Iin. The system voltage Vsys may be provided to a component (e.g., a main power manager 1400 of FIG. 1) of a mobile electronic device.

Referring to FIGS. 2 and 3, the first charging path P1 may include a single regulator (e.g., the first path regulator 110). In an exemplary embodiment of the present inventive concept, the first charging path P1 may include two or more regulators. Regulators included in the first charging path P1 may be connected in series or in parallel.

As described above, the first charging path P1 may include the path switch SP. For example, the path switch SP may pass or block the first charging current I1 in response to a control signal that is generated by the charger controller 150. The path switch SP may control a flow of a charging current used to charge the battery 1300. The path switch SP may control a connection between the battery 1300 and the system terminal SYS. When the path switch SP is used, a charging speed of the battery 1300 may be controlled, and the charger circuit chip 100 may operate in a stable manner.

In addition, when a voltage difference across the path switch SP and the amount of the first charging current I1 flowing through the path switch SP increase, power consumption through the path switch SP is increased. For example, if an output voltage of the battery 1300 is lowered (e.g., when the battery 1300 has been discharged) while the system terminal SYS outputs a stable system voltage Vsys, the voltage difference across the path switch SP may increase. Here, the first charging current I1 passing through the path switch SP may increase to charge the battery 1300, and thus, the power consumption through the path switch SP may also increase.

When power consumption through the path switch SP increases, a life or running time of the battery 1300 is shortened and heat generated by the charger circuit chip 100 increases. When the path switch SP is removed from the first charging path P1 to reduce the power consumption of the path switch SP, the charger circuit chip 100 might not operate in a stable manner. Thus, a charging path (e.g., a second charging path P2) which does not include the path switch SP may be separately provided from the first charging path P1. The second charging path P2 will be more fully described with reference to FIG. 4.

Figure 4:
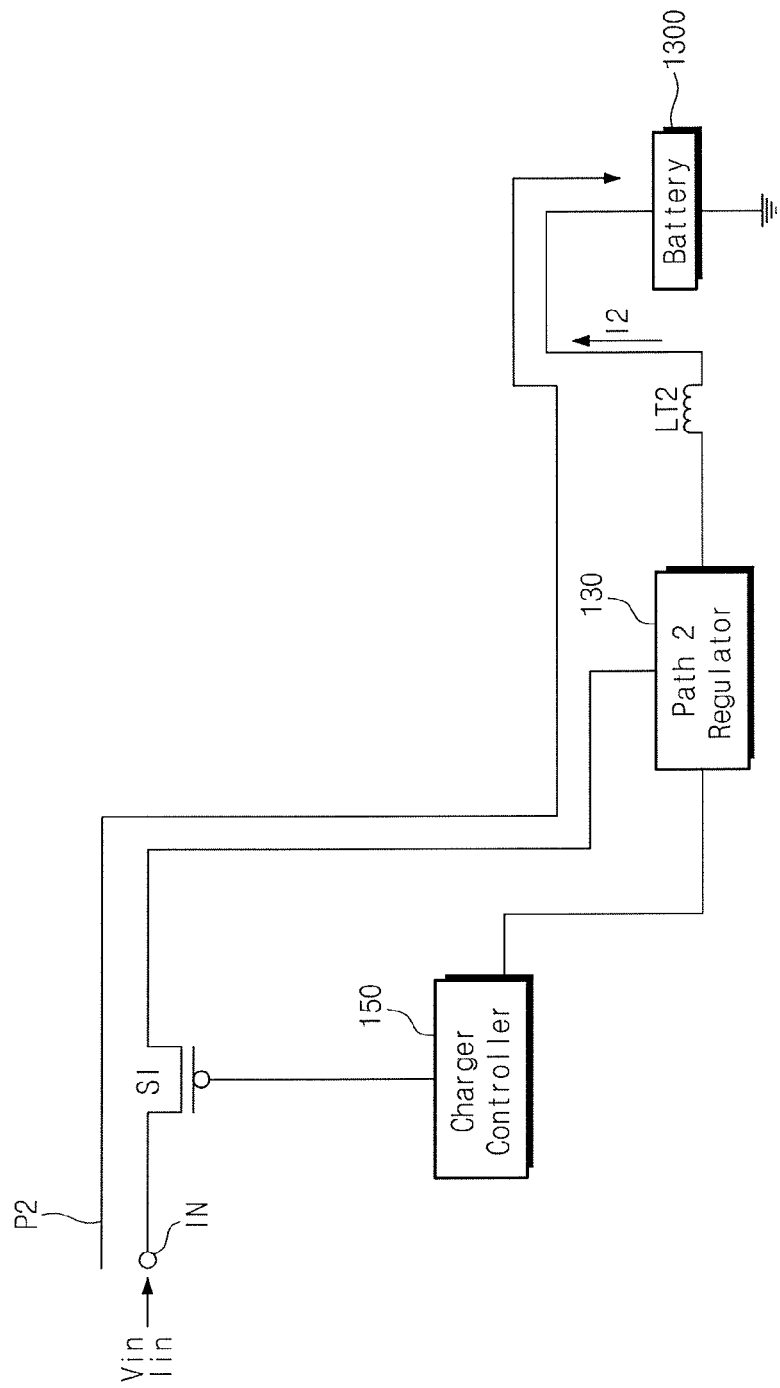
FIG. 4 is a diagram for describing a second charging path of the charger circuit chip of FIG. 2 according to an exemplary embodiment of the present inventive concept.

FIG. 4 is a diagram for describing a second charging path of the charger circuit chip 100 of FIG. 2 according to an exemplary embodiment of the present inventive concept. In an exemplary embodiment of the present inventive concept, the second charging path P2 may include an input switch SI, a second path regulator 130, and a second inductor LT2. The second charging path P2 might not include a path switch SP shown in FIGS. 2 and 3.

The second charging path P2 may transfer the second charging current I2 to the battery 1300. As described with reference to FIG. 2, the second charging current I2 may be generated based on the input voltage Vin and the input current Iin. To generate the second charging current I2, the second charging path P2 may include the second path regulator 130. Transfer the second charging current I2 to the battery 1300, the charger controller 150 may control operations of the input switch SI and the second path regulator 130.

Referring to FIGS. 2 and 4, the second charging path P2 includes a single regulator (e.g., the second path regulator 130). In an exemplary embodiment of the present inventive concept, the second charging path P2 may include two or more regulators. Regulators included in the second charging path P2 may be connected in series or in parallel. The regulators which are connected in parallel will be described with reference to FIG. 13.

As described above, the second charging path P2 may not include the path switch SP. For example, the path switch SP may not be connected between the second output terminal R2 and the battery terminal BAT of FIG. 2. The second charging path P2 may not be connected with the system terminal SYS. Accordingly, the second charging path P2 may not include the path switch SP.

When the battery 1300 is charged through the second charging path P2, power consumption by the path switch SP included in the first charging path P1 of FIG. 3 may be reduced, and thus, power and charging efficiency of the charger circuit chip 100 may be increased. In addition, heat generated by the charger circuit chip 100 may be reduced, and the battery 1300 may supply power with an increased running time.

Figure 5:
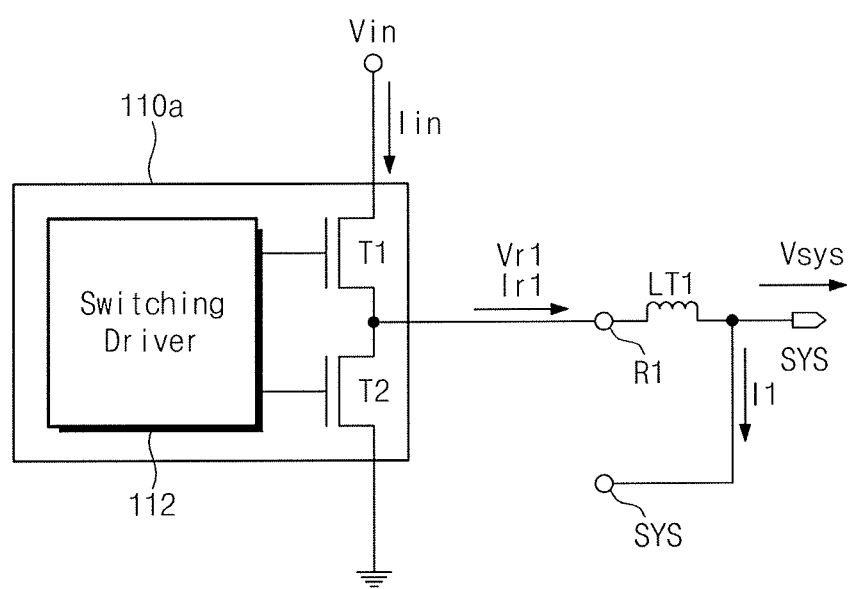
FIG. 5 is a block diagram illustrating a regulator included in the charger circuit chip of FIG. 2, according to an example embodiment of the present inventive concept.

FIG. 5 is a block diagram illustrating a regulator 110a included in the charger circuit chip 100 of FIG. 2, according to an exemplary embodiment of the present inventive concept. In an exemplary embodiment of the present inventive concept, the regulator 110a may be included in the first path regulator of FIG. 2.

In an exemplary embodiment of the present inventive concept, the regulator 110a may include a buck converter. In an exemplary embodiment described with reference to FIG. 5, the regulator 110a may include a first transistor T1, a second transistor T2, and a switching driver 112. The regulator 110a may receive at least one of the input voltage Vin and the input current Iin.

The switching driver 112 may turn on or turn off the first transistor T1 and the second transistor T2. The first transistor T1 and the second transistor T2 may be turned on in an alternate manner according to a control of the switching driver 112. Thus, the regulator 110a may generate a first regulation voltage Vr1 and a first regulation current Ir1 based on the input voltage Vin and the input current Iin.

For example, the switching driver 112 may employ at least one of the intensity of the first regulation current Ir1 and the amplitude of the first regulation voltage Vr1 to control the first transistor T1 and the second transistor T2. To this end, the regulator 110a may further include other components such as a current sensor, a comparator, etc. Detailed descriptions of a configuration and operations of the buck converter will be omitted.

As described with reference to FIG. 2, the regulator 110a may be connected to the first inductor LT1 through the first output terminal R1 to generate the first regulation voltage Vr1 and the first regulation current Ir1. The system terminal SYS may output a system voltage Vsys that is generated based on the first regulation voltage Vr1. The first charging current I1 that is generated based on the first regulation current Ir1 may be provided to the system terminal SYS.

The regulator 110a may be implemented in various manners. In an exemplary embodiment, the regulator 110a may include various switching regulators, such as a boost converter, a buck-boost converter, etc. In an exemplary embodiment, the regulator 110a may include a linear regulator, such as a low dropout regulator, etc. The implementation of the regulator 110a may be variously changed.

Further, the second path regulator 130 of FIG. 2 may include a configuration which is identical or similar to that of the regulator 110a of FIG. 5. An output of the second path regulator 130 may be provided to the battery terminal BAT of FIG. 2 through the second inductor LT2 as illustrated in FIG. 2. Thus, detailed descriptions associated with the second path regulator 130 will be omitted for brevity of description.

For example, the regulator 110a may operate in a constant voltage (CV) mode or a constant current (CC) mode. In the CV mode, the regulator 110a may generate a voltage (e.g., a first regulation voltage Vr1) having a substantially constant amplitude. The regulator 110a may control operations of the first transistor T1 and the second transistor T2 by means of the switching driver 112 to generate the voltage having the substantially constant amplitude. In an exemplary embodiment of the present inventive concept, the regulator 110a may regulate the first regulation voltage Vr1 having a substantially constant amplitude by using a separate voltage generator circuit.

In the CC mode, the regulator 110a may generate a current (e.g., a first regulation current Ir1) having substantially constant intensity. The regulator 110a may control operations of the first transistor T1 and the second transistor T2 through the switching driver 112 to generate the current having the substantially constant intensity.

Figure 6:
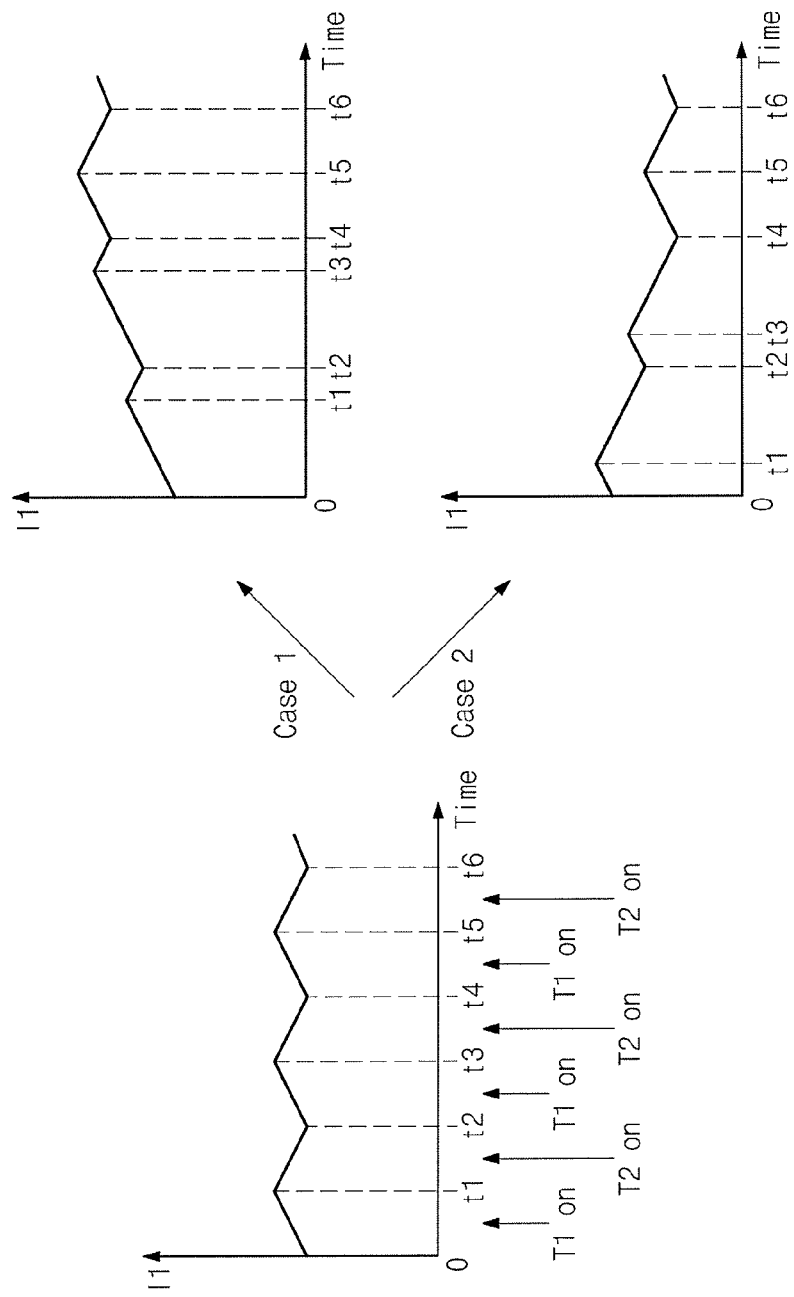
FIG. 6 is a graph for describing a process of controlling intensity of a charging current according to an exemplary embodiment of the present inventive concept.

FIG. 6 is a graph for describing a process of controlling intensity of a charging current (e.g., the first charging current I1 of FIG. 2) according to an exemplary embodiment of the present inventive concept. Here, the first path regulator 110 of FIG. 2 may include the regulator 110a (e.g., a buck converter) of FIG. 5. However, exemplary embodiments of the present inventive concept are not limited thereto.

Referring to FIG. 5 and a left graph of FIG. 6, during a time interval between 0 and t1, a time interval between t2 and t3, and a time interval between t4 and t5, the first transistor T1 may be turned on and the second transistor T2 may be turned off. When the first transistor T1 is turned on and the second transistor T2 is turned off, the intensity of the first charging current I1 may increase based on the input voltage Vin (refer to FIG. 2).

In addition, during a time interval between t1 and t2, a time interval between t3 and t4, and a time interval between t5 and t6, the first transistor T1 may be turned off and the second transistor T2 may be turned on. When the first transistor T1 is turned off and the second transistor T2 is turned on, the intensity of the first charging current I1 may decrease based on a ground voltage.

As described with reference to FIG. 5, the first transistor T1 and the second transistor T2 may be turned on in an alternate manner. A first regulation current Ir1 may be generated by turning on the first transistor T1 and the second transistor T2 in an alternate manner. Further, the first charging current I1 may be generated based on the first regulation current Ir1.

A first case Case 1 described with reference to a right upper graph of FIG. 6 corresponds to a case where the intensity of the first charging current I1 increases. The intensity of the first charging current I1 may gradually increase when the turn-on time duration (e.g., a time interval between 0 and t1) of the first transistor T1 is longer than the turn-on time duration (e.g., a time interval between t1 and t2) of the second transistor T2. When the first charging current I1 reaches target intensity, the turn-on time duration of the first transistor T1 may become substantially the same as the turn-on time duration of the second transistor T2. Thus, the intensity of the first charging current I1 may increase.

A second case Case 2 described with reference to a right lower graph of FIG. 6 corresponds to a case where the intensity of the first charging current I1 decreases. The intensity of the first charging current I1 may gradually decrease when the turn-on time duration (e.g., a time interval between 0 and t1) of the first transistor T1 is shorter than the turn-on time duration (e.g., a time interval between t1 and t2) of the second transistor T2. When the first charging current I1 reach target intensity, the turn-on time duration of the first transistor T1 may become substantially the same as the turn-on time duration of the second transistor T2. Thus, the intensity of the first charging current I1 may decrease.

The first charging current I1 may have the substantially constant intensity when the turn-on time duration of the first transistor T1 is the same as the turn-on time duration of the second transistor T2. For example, the intensity of the first charging current I1 may be controlled by adjusting the turn-on time duration of the first transistor T1 and the turn-on time duration of the second transistor T2.

As described in above, a process of controlling the intensity of the first charging current I1 has been described with reference to FIG. 6. In substantially the same manner as or similar manner to the process described with reference to FIG. 6, intensity of the second charging current I2 (refer to FIG. 2) may be controlled. Thus, detailed descriptions for controlling the second charging current I2 will be omitted for brevity of description.

Referring back to FIG. 2, the charging current Ic may be obtained by summing the first charging current I1 and the second charging current I2 and may be provided to the battery 1300. When a switching regulator is used as the first path regulator 110 and the second path regulator 130, each of the first charging current I1 and the second charging current I2 may include a ripple component, as shown in FIG. 6.

In an exemplary embodiment, a phase of the first charging current I1 and a phase of the second charging current I2 may be controlled to be different from each other (e.g., the first charging current I1 and the second charging current I2 may be "interleaved" with each other), and thus, a ripple component of the charging current Ic may be reduced. For example, when a phase difference between first charging current I1 and the second charging current I2 is 180 degrees, a ripple component of the charging current Ic may be minimized.

A ratio of the intensity of the first charging current I1 to the intensity of the second charging current I2 may be controlled by adjusting at least one of the intensity of the first charging current I1 and the intensity of the second charging current I2. For example, to generate the charging current Ic of 1 A, the first charging current I1 of 0.5 A and the second charging current I2 of 0.5 A may be generated. In an exemplary embodiment, the first charging current I1 of 0.2 A and the second charging current I2 of 0.8 A may be generated to generate the charging current Ic of 1 A. In an exemplary embodiment, the second charging current I2 of 1 A may be generated when the first charging current I1 may have the intensity of 0.

In an exemplary embodiment of the present inventive concept, referring back to FIG. 2, when the intensity of the first charging current I1 decreases, power consumed by the path switch SP may be reduced. This is because power consumed by the path switch SP is proportional to a product of a voltage difference across the path switch SP and a value of the intensity of current flowing through the path switch SP. The intensity of the first charging current I1 and the intensity of the second charging current I2 may be controlled according to various factors such as an operation mode of the charger circuit chip 100 (refer to FIG. 2), stability of an operation of the charger circuit chip 100, or the like.

FIG. 7 is a table illustrating a charging mode according to an exemplary embodiment of the present inventive concept. As described above, the charger circuit chip 100 of FIG. 2 may operate in a "charging mode". For example, the charger circuit chip 100 may perform an operation corresponding to the charging mode when the charger controller 150 detects that a power source is connected to the input terminal IN.

In the charging mode, the charger circuit chip 100 may convert received power to, e.g., an appropriate form or level. The charger circuit chip 100 may charge the battery 1300 by means of the converted power. In an exemplary embodiment, the charger circuit chip 100 may operate in one of three charging modes.

A first charging mode of the three charging modes is described with reference to FIG. 3. In the first charging mode, the charger circuit chip 100 may charge the battery 1300 only through the first charging path P1. In the first charging mode, the charging current Ic provided to the battery 1300 may be the same as the first charging current I1 passing through the path switch SP. In the first charging mode, the charger circuit chip 100 may provide the system voltage Vsys to the system terminal SYS. For example, in the first charging mode, the second regulator 130 may not operate under a control of the charger controller 150.

A second charging mode of the three charging modes is described with reference to FIG. 4. In the second charging mode, the charger circuit chip 100 may charge the battery 1300 only through the second charging path P2. In the second charging mode, the charging current Ic provided to the battery 1300 may be the same as the second charging current I2. The charger circuit chip 100 that operates in the second charging mode will be more fully described with reference to FIGS. 8 and 9.

A third charging mode of the three charging modes is described with reference to FIG. 2. In the third charging mode, the charger circuit chip 100 may charge the battery 1300 through both the first charging path P1 and the second charging path P2. In the third charging mode, the charging current Ic provided to the battery 1300 may correspond to a sum of the first charging current I1 and the second charging current I2. In the third charging mode, a ratio of the intensity of the first charging current I1 to the intensity of the second charging current I2 may be controlled by the charger controller 150.

For example, the charger circuit chip 100 may be implemented to operate in one of the first to third charging modes. In an exemplary embodiment, the charger circuit chip 100 may be implemented to operate one of the first to third charging modes according to an operating environment. For example, the charger controller 150 may switch the charging mode of the charger circuit chip 100 according to an operating environment. This will be more fully described with reference to FIG. 10.

Figure 8:
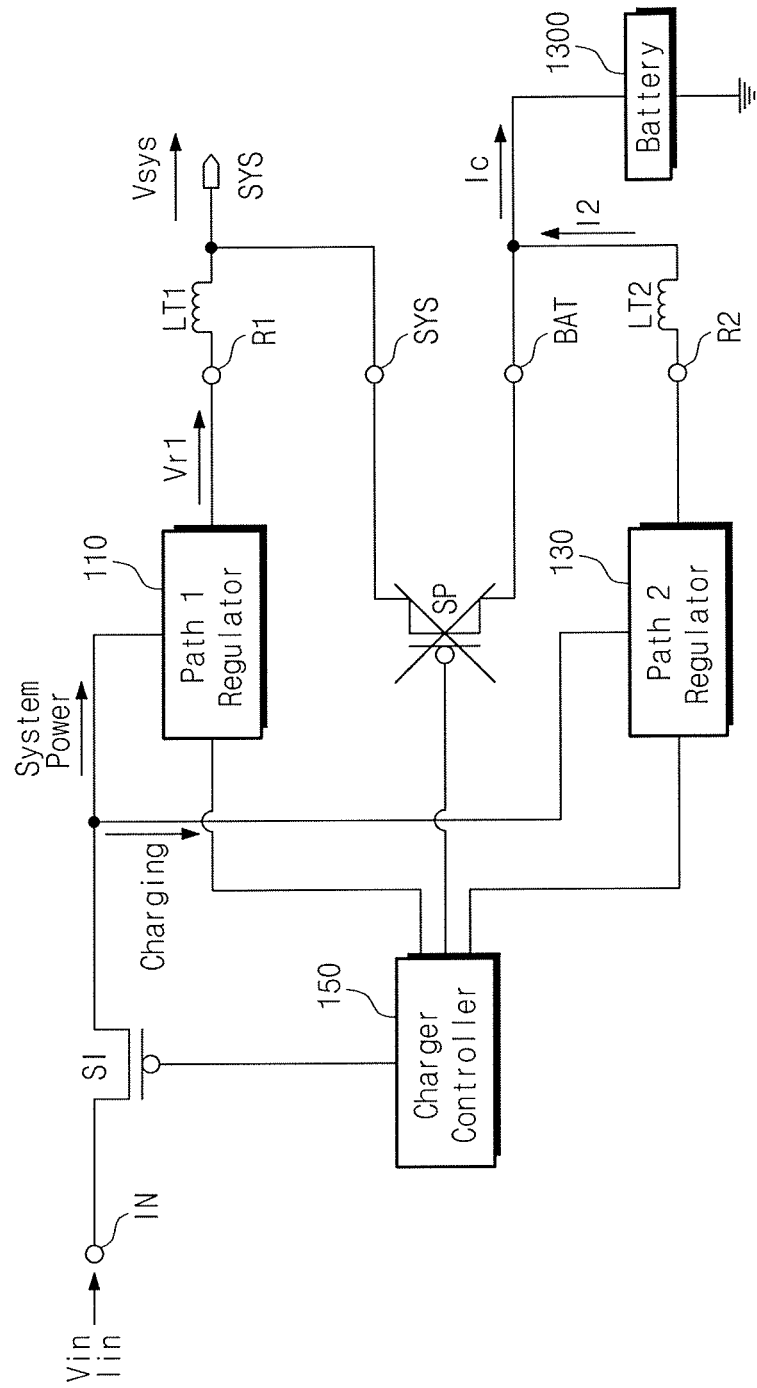
FIG. 8 is a diagram for describing a charger circuit chip of FIG. 2 operating in a second charging mode according to an exemplary embodiment of the present inventive concept.
Figure 9:
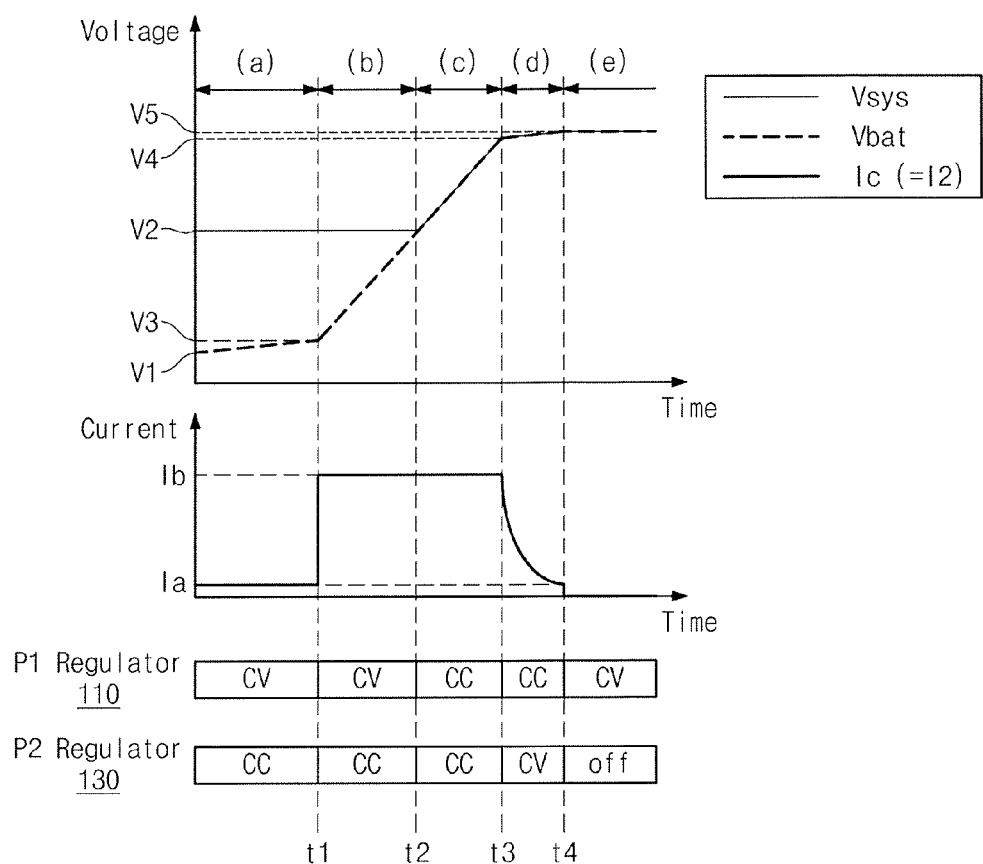
FIG. 9 is a graph for describing a charger circuit chip of FIG. 2 operating in a second charging mode according to an exemplary embodiment of the present inventive concept.

FIG. 8 is a diagram for describing a charger circuit chip 100 of FIG. 2 operating in a second charging mode according to an exemplary embodiment of the present inventive concept. FIG. 9 is a graph for describing a charger circuit chip 100 of FIG. 2 operating in a second charging mode according to an exemplary embodiment of the present inventive concept.

As described with reference to FIGS. 4 and 7, in the second charging mode, the charger circuit chip 100 may charge the battery 1300 only through the second charging path P2. As illustrated in FIG. 8, the second charging path P2 from the input switch SI to the second path regulator 130 may be used to charge the battery 1300. The second charging current I2 may be generated along the second charging path P2 based on the input voltage Vin and the input current Iin.

In the second charging mode, the first charging path P1 from the input switch SI to the first path regulator 110 may not be used to charge the battery 1300. The path switch SP may be turned off according to the control of the charger controller 150. Accordingly, the path switch SP may block the first charging current I1. Further, the charging current Ic provided to the battery 1300 may be the same as the second charging current I2. For example, the second charging current I2 may be used to charge the battery 1300.

In the second charging mode, the first charging path P1 may be used to supply system power to other component(s) (e.g., a main power manager 1400 of FIG. 1) of a mobile electronic device. The first path regulator 110 may generate a first regulation voltage Vr1 based on the input voltage Vin and the input current Iin. A system voltage Vsys provided to other component(s) of the mobile electronic device may be generated based on the first regulation voltage Vr1.

An exemplary operation of the second charging mode is described with reference to FIGS. 8 and 9. The following descriptions are provided to help understanding of the present inventive concept, but the present inventive concept is not to limit thereto.

A section (a) of FIG. 9 corresponds to a case where an output voltage Vbat of the battery 1300 is lower than a reference value (e.g., a case where the battery 1300 has been discharged). A charging operation may be carried out after the amplitude of the output voltage Vbat of the battery 1300 decreases down to a value of "V1". When the output voltage Vbat of the battery 1300 is lower than a reference value (e.g., when the battery 1300 has been discharged), the charging current Ic may have relatively weak intensity Ia (e.g., 0.1 A) and may be provided to the battery 1300 for stable charging.

During the section (a), the first path regulator 110 may operate in a "CV" mode to output a stable system voltage Vsys having a substantially constant amplitude. The amplitude of the system voltage Vsys may maintain at a value of "V2" during the section (a). During the section (a), the second path regulator 130 may operate in a "CC" mode to provide a stable charging current Ic having a substantially constant intensity to the battery 1300. The intensity of the charging current Ic may maintain at a value of "Ia" during the section (a).

When the battery 1300 is charged by the charging current Ic at time "t1", the amplitude of the output voltage Vbat of the battery 1300 may reach a reference value V3. During a section (b), the charging current Ic having intensity of Ib (e.g., 2 A), which is stronger than the intensity of Ia, may be provided to the battery 1300 to charge the battery 1300. In this case, the second path regulator 130 may operate in the "CC" mode, the first path regulator 110 may operate in the "CV" mode, and the stable system voltage Vsys having the substantially constant amplitude may be output.

When the battery 1300 is charged by the charging current Ic at time "t2", the amplitude of the output voltage Vbat of the battery 1300 may reach the value V2, (e.g., the system voltage Vsys). During a section (c), the second path regulator 130 may operate in the "CC" mode, and the stable charging current Ic having the substantially constant intensity (e.g., Ib) may be provided to the battery 1300. When the amplitude of the output voltage Vbat of the battery 1300 increases, the amplitude of the system voltage Vsys may increase. In this case, the first path regulator 110 may operate in the "CC" mode to continue to output the system voltage Vsys.

When the battery 1300 is charged by the charging current Ic at time "t3", the amplitude of the output voltage Vbat of the battery 1300 may reach a threshold value V4. During a section (d), the intensity of the charging current Ic may gradually decrease to completely charge the battery 1300. This is because the battery 1300 may not be completely charged due to a resistive component at an input terminal of the battery 1300 if the intensity of the charging current Ic is stronger than a reference intensity. In this case, the second path regulator 130 may operate in the "CV" mode to continue to generate the charging current Ic, and the first path regulator 110 may operate in the "CC" mode to continue to output the system voltage Vsys.

When the battery 1300 is charged by the charging current Ic at time "t4", the amplitude of the output voltage Vbat of the battery 1300 may reach a maximum value V5. For example, at time "t4", the battery 1300 may be completely charged. During a section (e), charging of the battery 1300 may be finished. Thus, during the section (e), the second path regulator 130 may stop operating, and the charging current Ic may have the intensity of "0". In this case, the first path regulator 110 may operate in the "CV" mode, and the stable system voltage Vsys having the substantially constant amplitude may be output.

As described with reference to FIGS. 8 and 9, in an exemplary embodiment, the path switch SP may be turned off in the second charging mode. Accordingly, power may not be consumed by the path switch SP in the second charging mode, and thus, power and charging efficiency of the charger circuit chip 100 may be increased and heat generated by the charger circuit chip 100 may be reduced.

Figure 10:
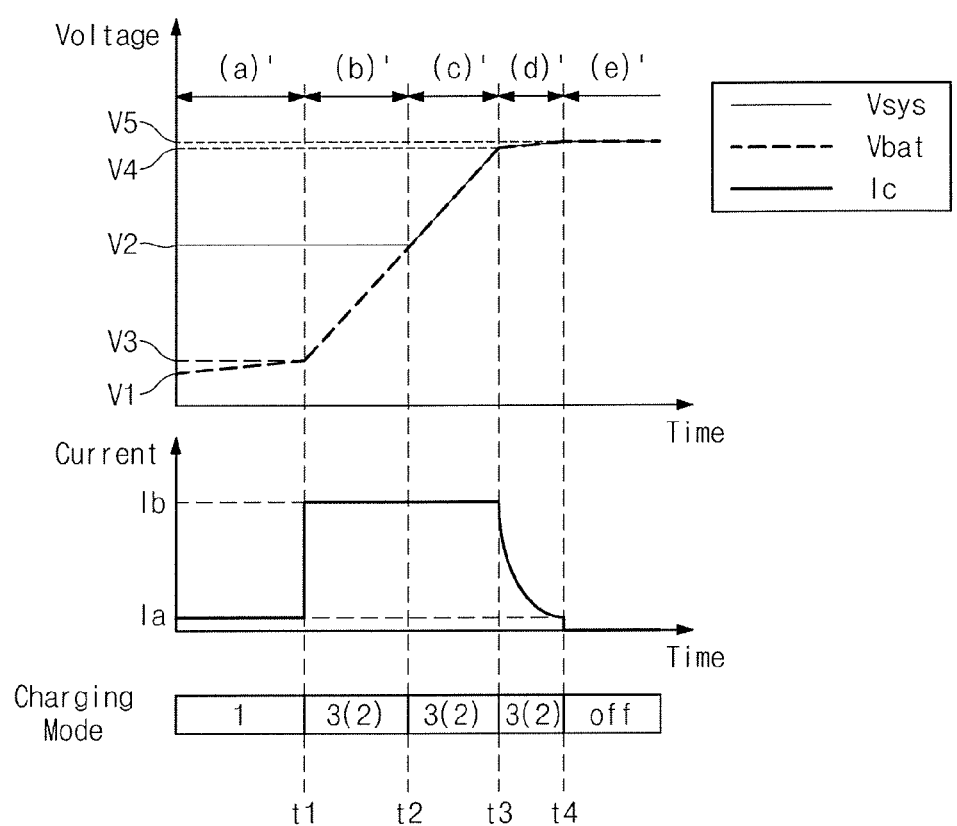
FIG. 10 is a graph for describing a change in a charging mode according to an exemplary embodiment of the present inventive concept.

FIG. 10 is a graph for describing a change in a charging mode according to an exemplary embodiment of the present inventive concept. An exemplary operation of the charger circuit chip 100 is described with reference to FIGS. 2 and 10. The following descriptions are provided to help understanding of the present inventive concept, but the present inventive concept is not to limit thereto.

A section (a)' of FIG. 10 corresponds to a case where an output voltage Vbat of the battery 1300 is lower than a reference value (e.g., a case where the battery 1300 has been discharged). A charging operation may be carried out after the amplitude of the output voltage Vbat of the battery 1300 decreases down to a value of "V1". When the output voltage Vbat of the battery 1300 is lower than a value (e.g., when the battery 1300 has been discharged), the charging current Ic may have relatively weak intensity of Ia (e.g., 0.1 A) and may be provided to the battery 1300 for stable charging.

During the section (a)', the charger circuit chip 100 may operate in a first charging mode. The path switch SP may be turned on according to a control of the charger controller 150, and may pass the first charging current I1. During the section (a)', the charging current Ic may have relatively weak intensity of Ia. Accordingly, the path switch SP may consume relatively low power when the first charging current I1 is provided to the battery 1300 through the path switch SP.

During the section (a)', the second path regulator 130 may not operate according to the control of the charger controller 150, and thus, the second charging current I2 output from the second path regulator 130 may have the intensity of "0". For example, only the first charging current I1 may be used to charge the battery 1300. During the section (a)', the charger circuit chip 100 may provide the first charging current I1 through the first charging path P1, and may output the system voltage Vsys through the system terminal SYS.

When the battery 1300 is charged by the charging current Ic at time "t1", the amplitude of the output voltage Vbat of the battery 1300 may reach a reference value V3. In a section (b)' of FIG. 10, the charging current Ic having intensity of Ib (e.g., 2 A), which is greater than the intensity of Ia, may be provided to the battery 1300 to charge the battery 1300. In this case, the path switch SP may consume relatively high power if the first charging current I1 having relatively strong intensity Ib is provided to the battery 1300 through the path switch SP.

Thus, during the section (b)', the charger circuit chip 100 may operate in a third charging mode. In the third charging mode, the charger circuit chip 100 may charge the battery 1300 through both the first charging path P1 and the second charging path P2. Since the charging current Ic is obtained by summing the first charging current I1 and the second charging current I2, the intensity of the first charging current I1 may be reduced when the intensity of the second charging current I2 increases. Thus, when the charger circuit chip 100 operates in the third charging mode, the power consumed by the path switch SP may be reduced by decreasing the intensity of the first charging current I1 and increasing the intensity of the second charging current I2.

In an exemplary embodiment, during the section (b)', the charger circuit chip 100 may operate in a second charging mode. In the second charging mode, the charger circuit chip 100 may charge the battery 1300 only through the second charging path P2. In the second charging mode, power may not be consumed by the path switch SP because the first charging current I1 has the intensity of "0".

During sections (c)' and (d)' after time "t2", the charger circuit chip 100 may continue to operate in the third charging mode. In an exemplary embodiment, during the sections (c)' and (d)' after time "t2", the charger circuit chip 100 may operate in the third charging mode. Further, at time "t4", the charging mode may be finished after charging of the battery 1300 is completed.

As described with reference to FIG. 10, the path switch SP may block the first charging current I1 in, e.g., the second charging mode, or may pass the first charging current I1 having the intensity weaker than "Ib" in, e.g., the third charging mode. Accordingly, power consumed by the path switch SP may be reduced. Thus, power and charging efficiency of the charger circuit chip 100 may be increased and heat generated by the charger circuit chip 100 may be reduced.

Figure 11:
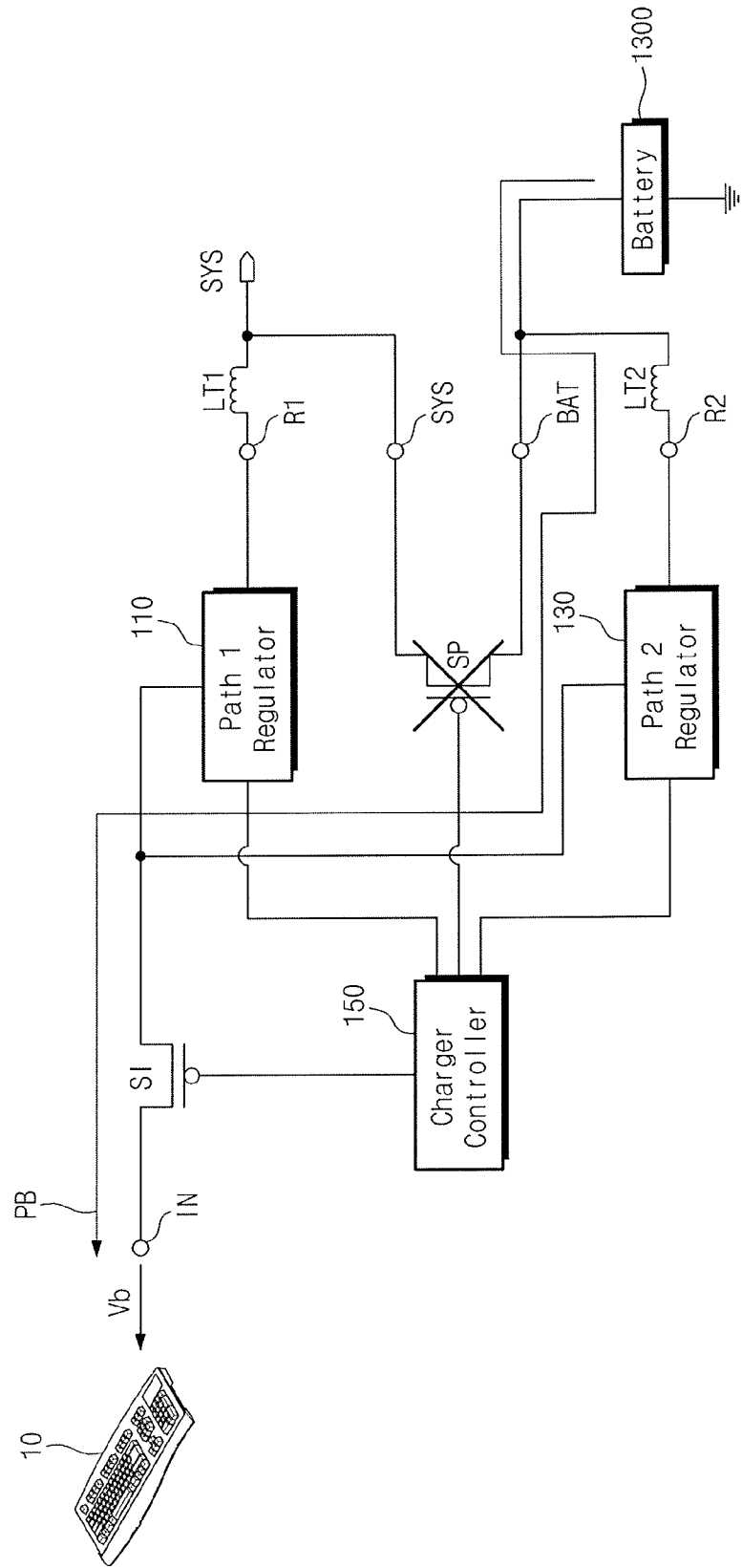
FIG. 11 is a diagram for describing a charger circuit chip of FIG. 2 operating in a boost mode according to an exemplary embodiment of the present inventive concept.

FIG. 11 is a diagram for describing a charger circuit chip 100 of FIG. 2 operating in a boost mode according to an exemplary embodiment of the present inventive concept.

For example, a peripheral device 10 (e.g., a keyboard, a speaker, etc.) used to assist the use of a mobile electronic device may be connected with the charger circuit chip 100 through the connector 1110. The charger circuit chip 100 may operate in a "boost mode" when the charger controller 150 detects that the peripheral device 10 is connected to the input terminal IN. The charger circuit chip 100 may operate in the boost mode to supply power to the peripheral device 10.

The charger circuit chip 100 may supply power to the peripheral circuit 10 through a boost path PB. The boost path PB may include a second inductor LT2, a second path regulator 130, and an input switch SI. A direction of current flowing along the boost path PB may be opposite to a direction of current flowing along a second charging path P2.

An output voltage of the battery 1300 may be boosted through the second inductor LT2 and the second path regulator 130. The second path regulator 130 may receive the output voltage of the battery 1300 through a second output terminal R2. The second path regulator 130 may boost the output voltage of the battery 1300 to output a boosted voltage Vb. The second path regulator 130 may provide the boosted voltage Vb to the input switch SI.

The input switch SI may be turned on according to a control of the charger controller 150. The input switch SI may transfer the boosted voltage Vb received from the second path regulator 130 to the input terminal IN. The boosted voltage Vb may be provided to the peripheral device 10 through the input terminal IN. For example, in the boost mode, the charger circuit chip 100 may boost the output voltage of the battery 1300, and may provide the boosted voltage Vb to the peripheral device 10.

In an exemplary embodiment, in the boost mode, the path switch SP may be turned off according to the control of the charger controller 150. In an exemplary embodiment, the first charging path P1 may not be used to supply power to the peripheral device 10 and the path switch SP may not consume power. Thus, power efficiency of the charger circuit chip 100 may be increased, and the battery 1300 may supply power with an increased running time. Further, heat generated by the charger circuit chip 100 may be reduced.

The present inventive concept is not limited to the above-described embodiments. In an exemplary embodiment, unlike FIG. 11, the path switch SP may be turned on according to the control of the charger controller 150 in the boost mode. In an exemplary embodiment, the output voltage of the battery 1300 may be used to output the system voltage Vsys through the system terminal SYS. In this exemplary embodiment, the output voltage of the battery 1300 may be provided to the system terminal SYS through the turned-on path switch SP, and the boosted voltage Vb may be transferred through the boost path PB. To this end, the first path regulator 110 may not operate according to the control of the charger controller 150. Accordingly, power consumption by the path switch SP may be minimized.

In an exemplary embodiment, unlike FIG. 11, the path switch SP may be turned on according to the control of the charger controller 150 in the boost mode. In this exemplary embodiment, the output voltage of the battery 1300 may be provided to the first output terminal R1 through the turned-on path switch SP. The first path regulator 110 may receive the output voltage of the battery 1300 through the first output terminal R1. The first path regulator 110 may boost the output voltage of the battery 1300 into the boosted voltage Vb. In this exemplary embodiment, the boosted voltage Vb may be generated by both the first path regulator 110 and the second path regulator 130. However, exemplary embodiments of the present inventive concept may be variously changed or modified.

Figure 12:
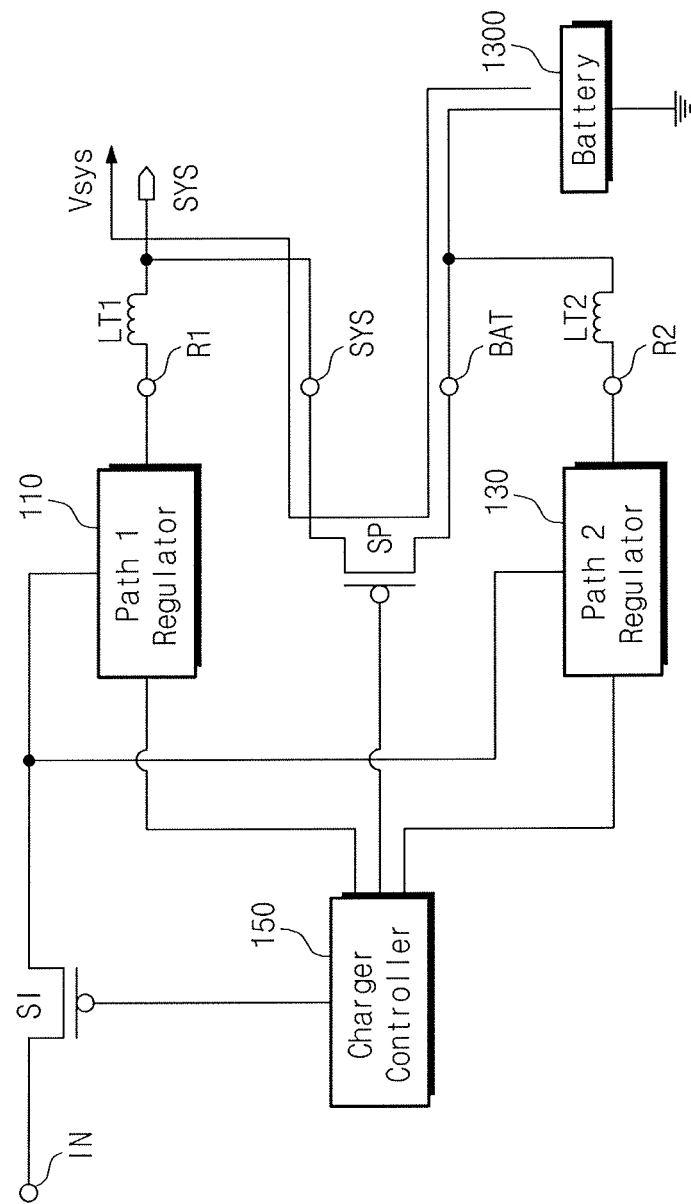
FIG. 12 is a diagram for describing a charger circuit chip of FIG. 2 operating in a battery power mode according to an exemplary embodiment of the present inventive concept.

FIG. 12 is a diagram for describing a charger circuit chip 100 of FIG. 2 operating in a battery power mode according to an exemplary embodiment of the present inventive concept.

Referring to FIG. 12, the input terminal IN may be floated when the input terminal IN is not connected with a power source and/or a peripheral device. The charger circuit chip 100 may operate in a "battery power mode" when the input terminal IN is floated. In the battery power mode, the charger circuit chip 100 may output the system voltage Vsys by using the output voltage of the battery 1300.

The path switch SP may be turned on according to a control of a charger controller 150. Accordingly, the output voltage of the battery 1300 may be provided to the system terminal SYS through the turned-on path switch SP. The output voltage of the battery 1300 provided to the system terminal SYS may be output as the system voltage Vsys.

Figure 13:
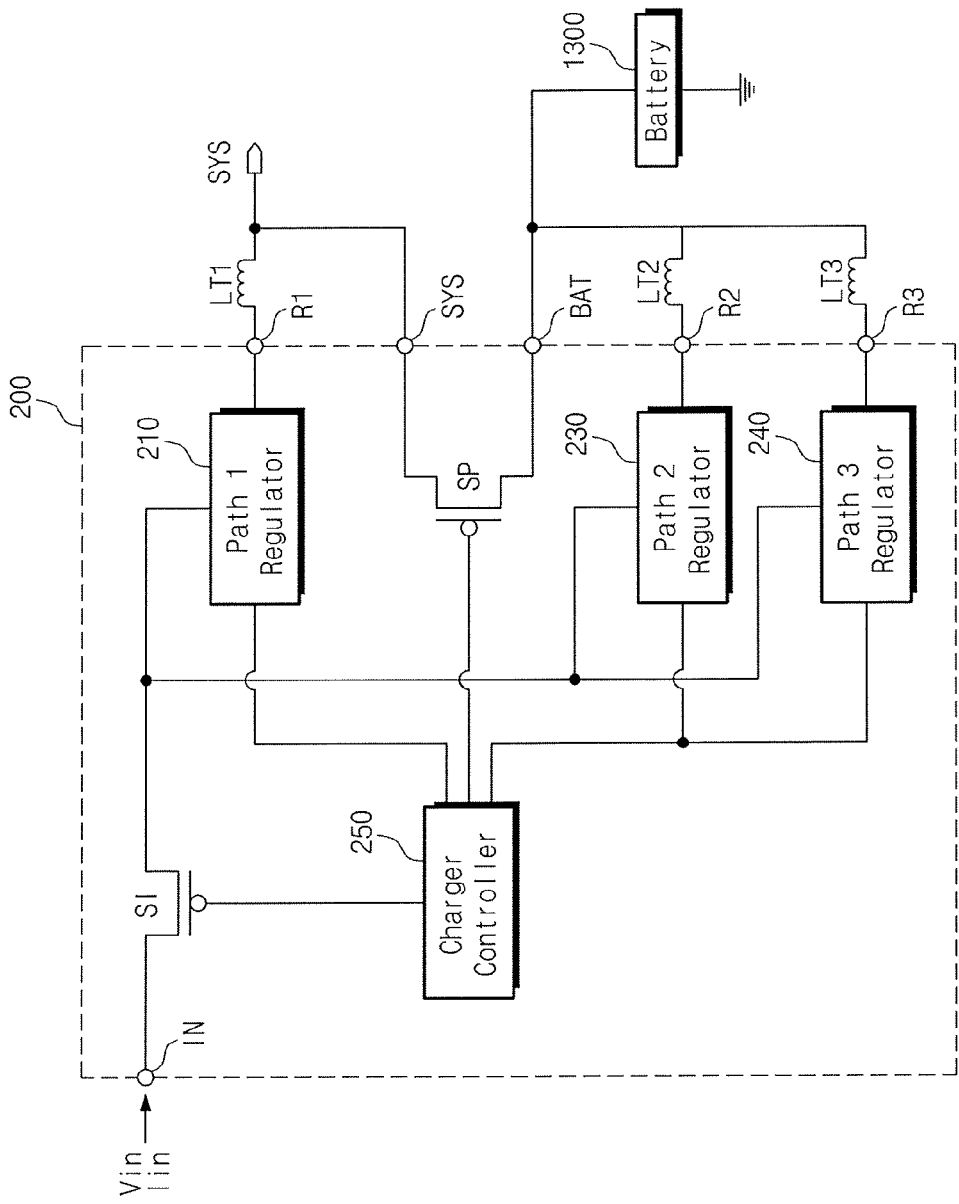
FIG. 13 is a block diagram illustrating a charger circuit chip according to an exemplary embodiment of the present inventive concept.

FIG. 13 is a block diagram illustrating a charger circuit chip 200 according to an exemplary embodiment of the present inventive concept. The charger circuit chip 200 may include a first path regulator 210, a path switch SP, a second path regulator 230, and a third path regulator 240. The charger circuit chip 200 may further include an input switch SI and a charger controller 250. In an exemplary embodiment, the charger circuit chip 1200 of FIG. 1 may include the charger circuit chip 200 of FIG. 13.

Each of the input switch SI, the first path regulator 210, the path switch SP, and the charger controller 250 of FIG. 13, may include configurations and functions of each of the input switch SI, the first path regulator 110, the path switch SP, and the charger controller 150 of FIG. 2. Each of the second path regulator 230 and the third path regulator 240 of FIG. 13 may include configurations and functions of the second path regulator 130 of FIG. 2. Thus, duplicate descriptions associated with the input switch SI, the first path regulator 210, the path switch SP, the second path regulator 230, the third path regulator 240, and the charger controller 250 of FIG. 13 will be omitted for brevity of description.

In an exemplary embodiment, the second charging path P2 may include one or more regulators. For example, as illustrated in FIG. 13, the second charging path P2 may include the second path regulator 230 and the third path regulator 240, which are connected in parallel. In an exemplary embodiment, when the second charging path P2 is used to charge a battery 1300, at least one of the second path regulator 230 and the third path regulator 240 may operate according to a control of the charger controller 250.

For example, a regulation current generated by the second path regulator 230 may be provided to the battery 1300 as a charging current through a second inductor LT2. For example, a regulation current generated by the third path regulator 240 may be provided to the battery 1300 as a charging current through a third inductor LT3. For example, regulation currents generated by both the second and third path regulators 230 and 240 may be provided to the battery 1300 as charging currents through the second and third inductors LT2 and LT3, respectively.

Referring to FIG. 13, in an exemplary embodiment, a charging current provided to the battery 1300 may correspond to a sum of a first charging current provided through a first inductor LT1 and the path switch SP, a second charging current provided through the second inductor LT2, and a third charging current provided through the third inductor LT3. Depending on the charging mode, at least one of the first path regulator 210, the second path regulator 230, and the third path regulator 240 may operate. In an exemplary embodiment, when two or more of the first path regulator 210, the second path regulator 230, and the third path regulator 240 operate, a ratio among the intensities of the first to third charging currents may be adjusted. In an exemplary embodiment, phases of the first to third charging currents may be controlled to be different from one another (e.g., the first to third charging currents may be interleaved with one another).

While FIG. 13 illustrates that the second charging path P2 includes the second and third path regulators 230 and 240 which are connected in parallel. However, the present inventive concept is not limited thereto. For example, the second charging path P2 may include three or more regulators. Further, the second charging path P2 may include regulators which are connected in series. In addition, a first charging path P1 (refer to FIG. 3) may include a plurality of regulators which are connected in series or in parallel.

Figure 14:
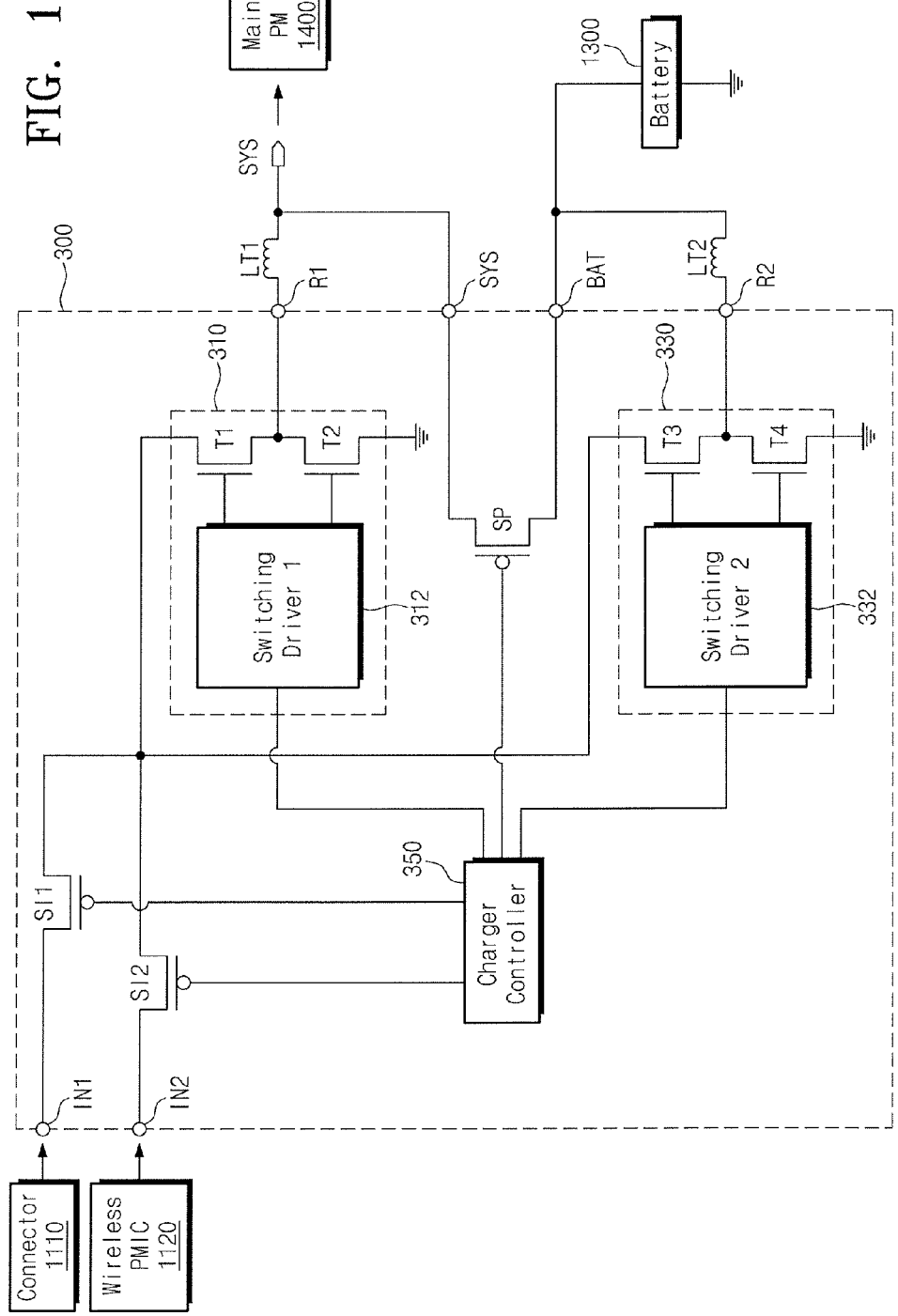
FIG. 14 is a block diagram illustrating a charger circuit chip according to an exemplary embodiment of the present inventive concept.

FIG. 14 is a block diagram illustrating a charger circuit chip 300 according to an exemplary embodiment of the present inventive concept. The charger circuit chip 300 may include a first path regulator 310, a path switch SP, and a second path regulator 330. The charger circuit chip 300 may further include a first input switch SI1, a second input switch SI2, and a charger controller 350. In an exemplary embodiment, the charger circuit chip 1200 of FIG. 1 may include the charger circuit chip 300 of FIG. 14.

Each of the first path regulator 310, the path switch SP, the second path regulator 330, and the charger controller 350 of FIG. 14 may include configurations and functions each of the first path regulator 110, the path switch SP, the second path regulator 130, and the charger controller 150 of FIG. 2. Each of the first and second input switches SI1 and SI2 of FIG. 14 may include configurations and functions of the input switch SI of FIG. 2. Thus, duplicate descriptions associated with the first and second input switches SI1 and SI2, the first path regulator 310, the path switch SP, the second path regulator 330, and the charger controller 350 of FIG. 14 will be omitted for brevity of description.

The charger circuit chip 300 may receive power from one or more power sources. For example, a connector 1110 may be supplied with power from a power source connected in a wired manner. The connector 1110 may convert the supplied power to, e.g., an appropriate form or level, and may provide the converted power to the charger circuit chip 300 through a first input terminal IN1. The first input switch SI1 may transfer or block the power provided through the first input terminal IN1 according to a control of the charger controller 350.

For example, a wireless power manager 1120 may be supplied with power from a wirelessly connected power source. The wireless power manager 1120 may convert the supplied power to, e.g., an appropriate form or level, and may provide the converted power to the charger circuit chip 300 through a second input terminal IN2. The input switch SI2 may transfer or block the power provided through the second input terminal IN2 according to the control of the charger controller 350.

In FIG. 14, it is illustrated that the charger circuit chip 300 is supplied with power from two power sources. However, the charger circuit chip 300 may be supplied with power from three or more power sources. A change or modification on the number of power sources, the number of input terminals, and the number of input switches may be variously made.

In an exemplary embodiment, the first path regulator 310 may include a buck converter. In this exemplary embodiment, the first path regulator 310 may include a first transistor T1, a second transistor T2, and a first switching driver 312. Each of the first transistor T1, the second transistors T2, and the switching driver 312 of FIG. 14 may include configurations and functions of each of the first transistor T1, the second transistor T2, and the switching driver 112 of FIG. 5.

In an exemplary embodiment, the second path regulator 330 may include a buck converter. In this exemplary embodiment, the second path regulator 330 may include a third transistor T3, a fourth transistor T4, and a second switching driver 332. Each of the third transistor T3, the fourth transistor T4, and the second switching driver 332 of FIG. 14 may include configurations and functions of each of the first transistor T1, the second transistor T2, and the switching driver 112 of FIG. 5.

An output of the first path regulator 310 may be provided to a system terminal SYS through a first output terminal R1 and a first inductor LT1. An output of the system terminal SYS may be provided to other components (e.g., a main power manager 1400) of a mobile electronic device.

Figure 15:
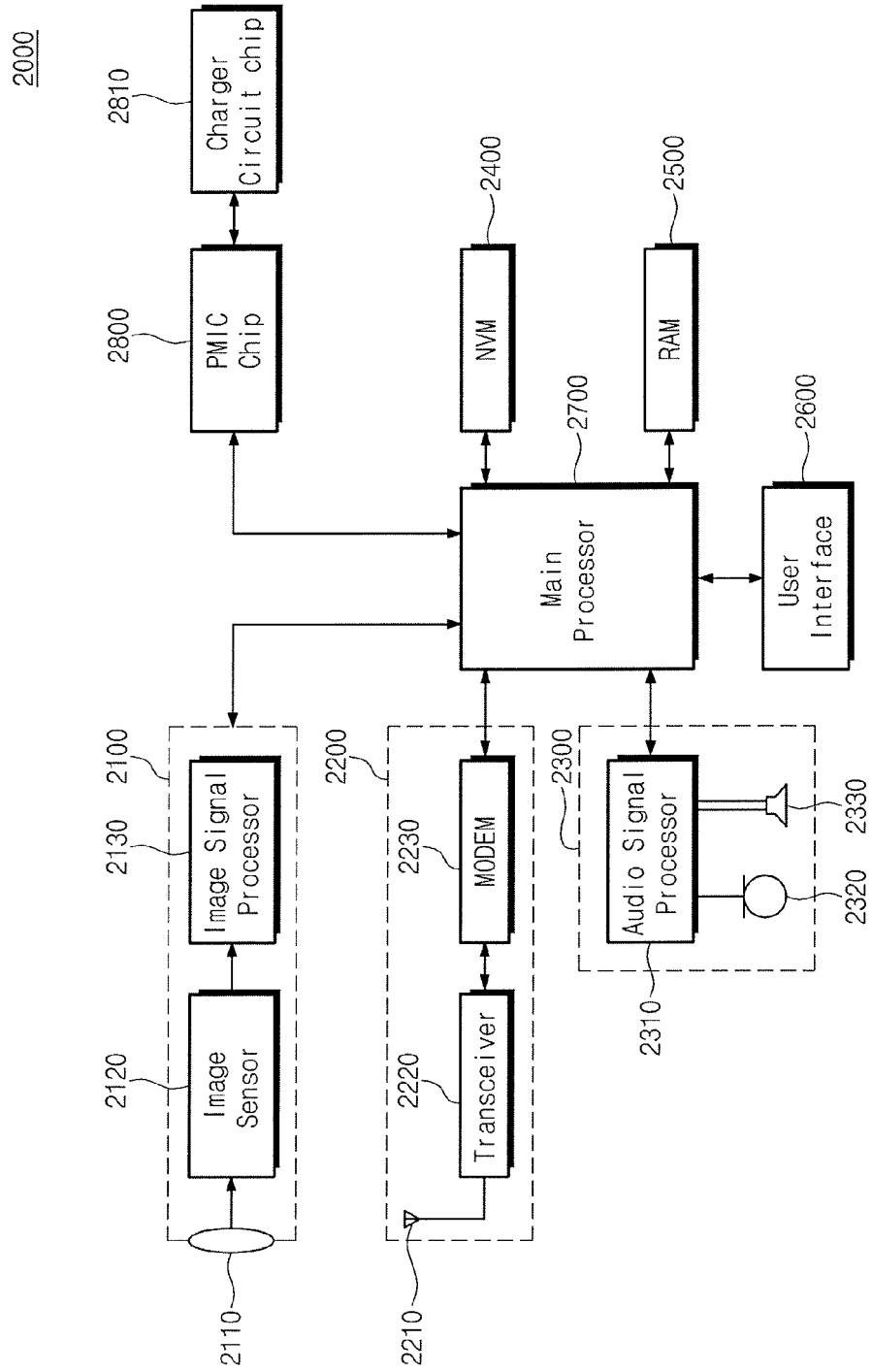
FIG. 15 is a block diagram illustrating a mobile electronic device including a charger circuit chip according to an exemplary embodiment of the present inventive concept.

FIG. 15 is a block diagram illustrating a mobile electronic device 2000 including a charger circuit chip 2810 according to an exemplary embodiment of the present inventive concept. The mobile electronic device 2000 may include an image processor 2100, a wireless communication module 2200, an audio processor 2300, a nonvolatile memory 2400, a random access memory (RAM) 2500, a user interface 2600, a main processor 2700, a power management integrated circuit (PMIC) chip 2800, and the charger circuit chip 2810. In an exemplary embodiment, the mobile electronic device 2000 may be a portable terminal, a portable digital assistant (PDA), a personal media player (PMP), a digital camera, a smart phone, a tablet personal computer (PC), a wearable device, etc.

The image processor 2100 may receive light through a lens 2110. An image sensor 2120 and an image signal processor 2130 of the image processor 2100 may generate one or more images based on the received light.

The wireless communication module 2200 may include an antenna 2210, a transceiver 2220, and a modem 2230. The wireless communication module 2200 may communicate with an external device or system according to one or more wireless communication protocols, such as long term evolution (LTE), world interoperability for microwave access (WiMAX), global system for mobile communication (GSM), code division multiple access (CDMA), Bluetooth, near field communication (NFC), Wi-Fi, radio frequency identification (RFID), etc.

The audio processor 2300 may process an audio signal by means of an audio signal processor 2310. The audio processor 2300 may receive an audio signal through a microphone 2320, and may output an audio signal through a speaker 2330.

The nonvolatile memory 2400 may store data (e.g., system data, user data, etc.) and retain the stored data regardless of whether power is supplied. For example, the nonvolatile memory 2400 may include one or more of a NAND-type flash memory, a phase-change RAM (PRAM), a magneto-resistive RAM (MRAM), a resistive RAM (ReRAM), a ferro-electric RAM (FRAM), a NOR-type flash memory, etc.

The RAM 2500 may store data that is used to operate the mobile electronic device 2000. For example, the RAM 2500 may be used as a working memory, an operation memory, or a buffer memory of the mobile electronic device 2000. The RAM 2500 may temporarily store data that has been processed or will be processed by the main processor 2700.

The user interface 2600 may interface a user with the mobile electronic device 2000 according to a control of the main processor 2700. For example, the user interface 2600 may include one or more input interfaces, such as a keyboard, a keypad, a button, a touch panel, a touch screen, a touch pad, a touch ball, a camera, a microphone, a gyroscope sensor, a vibration sensor, etc. Further, the user interface 2600 may include one or more output interfaces, such as a display device, a motor, etc. For example, the display device may include one or more of a liquid crystal display (LCD), a light emitting diode (LED) display, an organic LED (OLED) display, an active matrix OLED (AMOLED) display, etc.

The main processor 2700 may control overall operations of the mobile electronic device 2000. The image processor 2100, the wireless communication module 2200, the audio processor 2300, the nonvolatile memory 2400, and the RAM 2500 may execute a user instruction provided through the user interface 2600 according to the control of the main processor 2700. In an exemplary embodiment, the image processor 2100, the wireless communication module 2200, the audio processor 2300, the nonvolatile memory 2400, and the RAM 2500 may provide a service to a user through the user interface 2600 according to the control of the main processor 2700. The main processor 2700 may be implemented as a system on chip (SoC). For example, the main processor 2700 may include an application processor.

The PMIC chip 2800 may manage power used to operate the mobile electronic device 2000. The PMIC chip 2800 may include the main power manager 1400 of FIG. 1.

The charger circuit chip 2810 may be implemented according to exemplary embodiments of the present inventive concept described with reference to FIGS. 1 to 14. The charger circuit chip 2810 may include at least one charging path that includes a path switch SP and at least one charging path that does not include the path switch SP. The charger circuit chip 2810 may operate in one of a battery power mode, a charging mode, and a boost mode according to exemplary embodiments of the present inventive concept. Duplicate descriptions will be omitted for brevity of description.

A device configuration illustrated in each block diagram is provided to help understanding of the present inventive concept. Each block may be formed of smaller blocks according to functions. Alternatively, a plurality of blocks may form a larger block according to a function. That is, the present inventive concept is not limited to components illustrated in a block diagram.

While the present inventive concept has been described with reference to exemplary embodiments thereof, it will be understood that various changes in form and detail may be made therein without departing from the spirit and scope of the present inventive concept as defined by the appended claims.

What is claimed is:

1. A charger circuit comprising:
a first path regulator configured to output a first regulation current to a first output terminal based on an input voltage and an input current;
a path switch configured to pass or block a first charging current in response to a control signal, the first charging current being generated based on the first regulation current, the path switch being connected between the first output terminal and a battery terminal; and
a second path regulator configured to output a second regulation current to a second output terminal based on the input voltage and the input current,
wherein at least one of the first charging current or a second charging current is used to charge a battery at the battery terminal,
wherein the second charging current is generated based on the second regulation current,
wherein the path switch and another path switch is not connected between the second output terminal and the battery terminal, and
wherein the second charging current is transferred to the battery without passing through the path switch.

2. The charger circuit of claim 1, further comprising:
a charger controller configured to generate the control signal, and to control an operation of each of the first path regulator, the path switch, and the second path regulator.

3. The charger circuit of claim 1, wherein in a charging mode where the battery is charged, the path switch blocks the first charging current, and the second charging current is used to charge the battery.

4. The charger circuit of claim 3, wherein in the charging mode, the first path regulator generates a first regulation voltage based on the input voltage and the input current, and a system voltage provided to a power management chip is generated based on the first regulation voltage.

5. The charger circuit of claim 1, wherein each of the first and second path regulators comprises a buck converter, a boost converter, a buck-boost converter, or a linear regulator.

6. A charger circuit comprising:
a first charging path transferring a first charging current from a first output terminal to a battery terminal to charge a battery, the first charging current being generated based on an input voltage and an input current; and
a second charging path transferring a second charging current from a second output terminal to the battery terminal to charge the battery, the second charging current being generated based on the input voltage and the input current,
wherein the first charging path comprises a path switch configured to pass or block the first charging current in response to a control signal, the path switch being connected between the first output terminal and the battery terminal, and
wherein the path switch and another path switch is not connected between the second output terminal and the battery terminal.

7. The charger circuit of claim 6, further comprising:
a charger controller configured to generate the control signal, to control an operation of the path switch, and to control at least one of intensity of the first charging current, intensity of the second charging current, or a ratio of the intensity of the first charging current to the intensity of the second charging current.

8. The charger circuit of claim 7, wherein in a charging mode where the battery is charged, the path switch passes the first charging current, and at least one of the first charging current or the second charging current is used to charge the battery.

9. The charger circuit of claim 8, wherein when a value of an output voltage of the battery is smaller than a reference value in the charging mode, the second charging current has an intensity of "0", and the first charging current is used to charge the battery, according to the control signal of the charger controller.

10. The charger circuit of claim 9, wherein when the value of the output voltage of the battery is greater than or equal to the reference value in the charging mode, a third charging current is used to charge the battery according to the control signal of the charger controller, and
wherein the third charging current corresponds to a sum of the first charging current and the second charging current.

11. The charger circuit of claim 6, wherein the input voltage and the input current are supplied from at least one power source.

12. The charger circuit of claim 6, wherein the first charging path further comprises one or more regulators.

13. The charger circuit of claim 6, wherein the second charging path comprises one or more regulators.

14. A charger circuit comprising:
a first charging path transferring a first charging current from a first output terminal to a battery terminal to charge a battery; and
a second charging path transferring a second charging current from a second output terminal to the battery terminal to charge the battery,
wherein the first charging path comprises a first path regulator and a path switch, the path switch passes or blocks the first charging current in response to a control signal, and the path switch is connected between the first output terminal and the battery terminal,
wherein the second charging path comprises a second path regulator, without the path switch and another path switch between the second output terminal and the battery terminal and
wherein the first path regulator comprises first and second transistors, and a switching driver for turning on or turning off each of the first and second transistors in an alternate manner to generate the first charging current.

15. The charger circuit of claim 14, wherein intensity of the first charging current is controlled by adjusting a turn-on time of each of the first and second transistors.

16. The charger circuit of claim 14, wherein the first charging current and the second charging current are interleaved with each other.

17. The charger circuit of claim 14, further comprising a charger controller controlling a ratio of intensity of the first charging current to intensity of the second charging current.

18. The charger circuit of claim 14, further comprising an input switch,
wherein the input switch comprises a first terminal connected to an input terminal of the charger circuit, and a second terminal connected to the first path regulator,
wherein the path switch comprises a third terminal connected to a system terminal, and a fourth terminal connected to the battery terminal, and
wherein the system terminal outputs a system voltage based on an output of the first path regulator.

19. The charger circuit of claim 18, wherein when the input terminal is floated, the path switch is turned on and an output voltage of the battery is provided to the system terminal through the turned-on path switch.

20. The charger circuit of claim 18, wherein the charger circuit operates in a boost mode for supplying power to a peripheral device when the peripheral device is connected to the input terminal.

* * * * *